US012730827B2

(12) United States Patent
Rand et al.

(10) Patent No.: US 12,730,827 B2
(45) Date of Patent: Sep. 8, 2026

(54) SELECTIVE PROOF OF EXISTENCE USING ORDERED, APPEND-ONLY DATA STORAGE

(71) Applicant: nChain Licensing AG, Zug (CH)

(72) Inventors: Ricky Charles Rand, London (GB); Paul Clark, London (GB); Alex Woods, London (GB); Jack Owen Davies, London (GB); Wei Zhang, London (GB)

(73) Assignee: nChain Licensing AG, Zug (CH)

( * ) Notice: Subject to any disclaimer, the term of this patent is extended or adjusted under 35 U.S.C. 154(b) by 0 days.

(21) Appl. No.: 18/713,595

(22) PCT Filed: Mar. 23, 2023

(86) PCT No.: PCT/EP2023/057563
§ 371 (c)(1),
(2) Date: May 24, 2024

(87) PCT Pub. No.: WO2023/180487
PCT Pub. Date: Sep. 28, 2023

(65) Prior Publication Data

US 2025/0139127 A1 May 1, 2025

(30) Foreign Application Priority Data

Mar. 25, 2022 (GB) ...................................... 2204293
May 6, 2022 (GB) ...................................... 2206682

(51) Int. Cl.
*G06F 16/28* (2019.01)
*G06F 16/901* (2019.01)
(Continued)

(52) U.S. Cl.
CPC ........ *G06F 16/282* (2019.01); *G06F 16/9024* (2019.01); *G06Q 20/382* (2013.01);
(Continued)

(58) Field of Classification Search
None
See application file for complete search history.

(56) References Cited

U.S. PATENT DOCUMENTS

2019/0245680 A1* 8/2019 Boutaba ................ H04L 9/0637
2022/0083512 A1* 3/2022 Wu ....................... H04L 63/123
2023/0121349 A1* 4/2023 Griggs ...................... H04L 9/50
713/168

FOREIGN PATENT DOCUMENTS

WO 2021079224 A1 4/2021

OTHER PUBLICATIONS

Dave, Jay, et al. "Secure proof of ownership using merkle tree for deduplicated storage." Automatic Control and Computer Sciences 54 (2020): 358-370. (Year: 2020).*

(Continued)

*Primary Examiner* — Umar Mian
(74) *Attorney, Agent, or Firm* — Galvani Smith PLLC; Rowan P. Smith

(57) ABSTRACT

There is provided a computer implemented method. The method provides a generation of a proof of existence data structures. The method comprising: (i) receiving a request comprising a data reveal path, the data reveal path referencing a node of interest within an input hierarchical data structure (ii) obtaining the input hierarchical data structure comprising an input root node and a plurality of input nodes, wherein each of the input nodes within the input hierarchical data structure have an associated value, and (iii) generating an output hierarchical data structure based on the data reveal path and the input hierarchical data structure, wherein the output hierarchical data structure comprises a plurality of output nodes. There is also provided a method for verification of the proof of existence.

15 Claims, 15 Drawing Sheets

(51) Int. Cl.

| | |
|---|---|
| ***G06Q 20/38*** | (2012.01) |
| ***G06Q 20/40*** | (2012.01) |
| ***H04L 9/00*** | (2022.01) |
| ***H04L 9/32*** | (2006.01) |

(52) U.S. Cl.
CPC ......... *G06Q 20/401* (2013.01); *H04L 9/3236* (2013.01); *H04L 9/50* (2022.05)

(56) References Cited

OTHER PUBLICATIONS

Cook, John D. "Mental cryptography and good passwords." Published Sep. 23, 2014 by Heidelberg Laureate Forum. Accessed Dec. 10, 2025 from https://scilogs.spektrum.de/hlf/mental-cryptography-and-good-passwords/ (Year: 2014).*

"Are there cryptographic hash functions that can be computed using only paper and pen?" Published May 2024 by Stack Exchange. Accessed Dec. 10, 2025 from https://crypto.stackexchange.com/questions/9787/are-there-cryptographic-hash-functions-that-can-be (Year: 2025).*

"Cryptographic hash functions explained." Published Oct. 3, 2025 by Finst B.V. Accessed Dec. 10, 2025 from https://finst.com/en/learn/articles/cryptographic-hash-functions-explained (Year: 2025).*

"Cryptography Hash Functions." Published Jul. 23, 2025 by GeeksforGeeks. Accessed Dec. 10, 2025 from https://www.geeksforgeeks.org/competitive-programming/cryptography-hash-functions/ (Year: 2025).*

PCT/EP2022/057563 International Search Report and Written Opinion dated Jul. 7, 2023, 10 pages.

* cited by examiner

680

SELECTIVE PROOF OF EXISTENCE USING ORDERED, APPEND-ONLY DATA STORAGE

CROSS REFERENCE TO RELATED APPLICATIONS

This application is the U.S. National Stage of International Application No. PCT/EP2023/057563 filed on Mar. 23, 2023, which claims the benefit of United Kingdom Patent Application No. 2204293.1, filed on Mar. 25, 2022 and United Kingdom Patent Application No. 2206682.3, filed on May 6, 2022, the contents of which are incorporated herein by reference in their entireties.

FIELD

The present disclosure relates to methods, systems, and data structures for implementing a platform of one or more services associated with a distributed ledger, i.e. a blockchain, for one or more clients. More particularly, the present disclosure relates, but is not limited to, the provision of data storage and verification of data storage associated with a blockchain.

BACKGROUND

A blockchain refers to a form of distributed data structure, wherein a duplicate copy of the blockchain is maintained at each of a plurality of nodes in a distributed peer-to-peer (P2P) network (referred to below as a "blockchain network") and widely publicised. The blockchain comprises a chain of blocks of data, wherein each block comprises one or more transactions. Each transaction, other than so-called "coinbase transactions", points back to a preceding transaction in a sequence which may span one or more blocks up until one or more coinbase transactions. Coinbase transactions are discussed below. Transactions that are submitted to the blockchain network are included in new blocks. New blocks are created by a process often referred to as "mining", which involves each of a plurality of the nodes competing to perform "proof-of-work", i.e. solving a cryptographic puzzle based on a representation of a defined set of ordered and validated pending transactions waiting to be included in a new block of the blockchain. It should be noted that the blockchain may be pruned at a node, and the publication of blocks can be achieved through the publication of mere block headers.

The transactions in the blockchain are used to perform one or more of the following: to convey a digital asset (i.e. a number of digital tokens), to order a set of journal entries in a virtualised ledger or registry, to receive and process timestamp entries, and/or to time-order index pointers. A blockchain can also be exploited in order to layer additional functionality on top of the blockchain. Blockchain protocols may allow for storage of additional user data or indexes to data in a transaction. There is no pre-specified limit to the maximum data capacity that can be stored within a single transaction, and therefore increasingly more complex data can be incorporated. For instance this may be used to store an electronic document in the blockchain, or audio or video data.

Nodes of the blockchain network (which are often referred to as "miners") perform a distributed transaction registration and verification process, which will be described in detail below. In summary, during this process a node validates transactions and inserts them into a block template for which they attempt to identify a valid proof-of-work solution. Once a valid solution is found, a new block is propagated to other nodes of the network, thus enabling each node to record the new block on the blockchain. In order to have a transaction recorded in the blockchain, a user (e.g. a blockchain client application) sends the transaction to one of the nodes of the network to be propagated. Nodes which receive the transaction may race to find a proof-of-work solution incorporating the validated transaction into a new block. Each node is configured to enforce the same node protocol, which will include one or more conditions for a transaction to be valid. Invalid transactions will not be propagated nor incorporated into blocks. Assuming the transaction is validated and thereby accepted onto the blockchain, then the transaction (including any user data) will thus remain registered and indexed at each of the nodes in the blockchain network as an immutable public record.

The node who successfully solved the proof-of-work puzzle to create the latest block is typically rewarded with a new transaction called the "coinbase transaction" which distributes an amount of the digital asset, i.e. a number of tokens. The detection and rejection of invalid transactions is enforced by the actions of competing nodes who act as agents of the network and are incentivised to report and block malfeasance. The widespread publication of information allows users to continuously audit the performance of nodes. The publication of the mere block headers allows participants to ensure the ongoing integrity of the blockchain.

In an "output-based" model (sometimes referred to as a UTXO-based model), the data structure of a given transaction comprises one or more inputs and one or more outputs. Any spendable output comprises an element specifying an amount of the digital asset that is derivable from the proceeding sequence of transactions. The spendable output is sometimes referred to as a UTXO ("unspent transaction output"). The output may further comprise a locking script specifying a condition for the future redemption of the output. A locking script is a predicate defining the conditions necessary to validate and transfer digital tokens or assets. Each input of a transaction (other than a coinbase transaction) comprises a pointer (i.e. a reference) to such an output in a preceding transaction, and may further comprise an unlocking script for unlocking the locking script of the pointed-to output. So consider a pair of transactions, call them a first and a second transaction (or "target" transaction). The first transaction comprises at least one output specifying an amount of the digital asset, and comprising a locking script defining one or more conditions of unlocking the output. The second, target transaction comprises at least one input, comprising a pointer to the output of the first transaction, and an unlocking script for unlocking the output of the first transaction.

In such a model, when the second, target transaction is sent to the blockchain network to be propagated and recorded in the blockchain, one of the criteria for validity applied at each node will be that the unlocking script meets all of the one or more conditions defined in the locking script of the first transaction. Another will be that the output of the first transaction has not already been redeemed by another, earlier valid transaction. Any node that finds the target transaction invalid according to any of these conditions will not propagate it (as a valid transaction, but possibly to register an invalid transaction) nor include it in a new block to be recorded in the blockchain.

An alternative type of transaction model is an account-based model. In this case each transaction does not define the amount to be transferred by referring back to the UTXO of a preceding transaction in a sequence of past transactions, but rather by reference to an absolute account balance. The current state of all accounts is stored by the nodes separate to the blockchain and is updated constantly.

One area of current research is the use of the blockchain for the implementation of "smart contracts". These are computer programs designed to automate the execution of the terms of a machine-readable contract or agreement. Unlike a traditional contract which would be written in natural language, a smart contract is a machine-executable program, which comprises rules that can process inputs in order to produce results, which can then cause actions to be performed dependent upon those results. Another area of blockchain-related interest is the use of 'tokens' (or 'coloured coins') to represent and transfer real-world entities via the blockchain. A potentially sensitive or secret item can be represented by the token, which has no discernible meaning or value. The token thus serves as an identifier that allows the real-world item to be referenced from the blockchain.

The above-mentioned examples or scenarios, whilst making use of the advantages of the blockchain to provide a permanent, tamper-proof record of events; requires a client, client entity, computing devices, or a terminal associated with a client, to include or implement software and/or hardware, or a processor/module, such as a digital wallet for implementing functionality for managing digital assets, managing cryptographic keys for Elliptic Curve Digital Signature Algorithm (ECDSA) that are used, for example, by the BSV (Bitcoin Satoshi's Vision) Blockchain. In addition, there is also a requirement for the client device to be able to implement blockchain transaction construction and have access to BSV libraries. Thus, not only do clients need to include processing to implement such functionality, but they also need to ensure that appropriate security measures are implemented for such processes before they can make use of a blockchain network to send, receive, and view data, and/or digital assets, which relate to a smart contract or a token representing a real world asset transaction.

Accordingly, there is a desire to implement secure, low-complexity, user-friendly, efficient, and robust techniques, that will allow any client, whether computationally sophisticated or not, to be able to instantaneously access and interact with useful applications associated with the blockchain, in a simple, fast, accurate, reliable, and secure manner, that is computationally and functionally less onerous. More particularly, there is a desire to make use of distributed ledger (blockchain) technology, and the advantages of increased security, transparency, and reliability of records, to provide a common platform or interface for a plurality of blockchain related services or applications, that enable any client computing device to ensure any data, event, or digital asset associated with the client, can be instantaneously and securely mined, or written into the blockchain easily, thereby providing a lasting, tamper-proof, and auditable record of it, which can be created, written, updated, read, or viewed as required. Further, a grouping of such data may be desired such that transactions may be traversed according to their group or otherwise associated with each other as they exist on the blockchain.

Such an improved solution has now been devised. The present disclosure addresses the above technical concerns by proposing one or more techniques, whereby data, or information associated with a client, may be simply, securely, and instantaneously written into, or obtained from the blockchain, by methods, devices, and systems which provide an application programming interface (API) for one or more services associated with a blockchain, without such clients needing to implement any processing or functionality for using the blockchain, while still being able to avail all advantages associated with the blockchain.

SUMMARY OF THE INVENTION

According to a first aspect, the present disclosure proposes a computer implemented method, device, and system for providing proof of existence, the method comprising: (i) receiving a request comprising a data reveal path, the data reveal path referencing a node of interest within an input hierarchical data structure, (ii) obtaining the input hierarchical data structure comprising an input root node and a plurality of input nodes, wherein each of the input nodes within the input hierarchical data structure have an associated value, (iii) generating an output hierarchical data structure based on the data reveal path and the input hierarchical data structure, wherein the output hierarchical data structure comprises a plurality of output nodes, wherein each of the plurality of output nodes has an associated node in the input hierarchical data structure, wherein the plurality of output nodes comprises an output root node, and an output node of interest that is associated with the node of interest within the input hierarchical data structure, and wherein the output node of interest and each ancestor node of the output node of interest comprises a value and all other nodes in the output hierarchical data structure comprise a digest based on the associated value of the corresponding node of the input hierarchical data structure.

According to a second aspect, the present disclosure proposes a computer implemented method, device, and system for providing a proof of existence, the method comprising: (i) obtaining an input root digest from a blockchain, (ii) obtaining a data reveal path, the data reveal path referencing a node of interest within an input hierarchical data structure, (iii) obtaining an output hierarchical data structure comprising plurality of nodes and wherein each of the plurality of nodes correspond to a node within the input hierarchical data structure, (iv) calculating a digest for the node of the output hierarchical data structure corresponding to the data reveal path, (v) calculating a digest associated with each ancestor of the node corresponding to the data reveal path until there are no more ancestor nodes, and wherein the top most digest is an output root digest, and (vi) verifying the node of interest's value based on a comparison with the input root digest and the output root digest.

According to a third aspect, the present disclosure proposes a computer implemented method, device, and system for generating and storing a representation of client data item associated with a set of data items, the method comprising: (i) receiving a request comprising client data relating to the current state, (ii) obtaining a set of child nodes, wherein the child nodes are based on the following: the client data; metadata relating to the client data; a first reference to a previous data item in the set of data items; and a second reference to a next data item in the set of data items, (iii) generating a hierarchical data structure based on the plurality of child nodes, wherein the hierarchical data structure comprises a root nodes, wherein the majority of the child nodes are obtained in advance of generation of the hierarchical data structure, and (iv) storing the root node for later recall.

Some specific components and embodiments of the disclosed method are now described by way of illustration with reference to the accompanying drawings, in which like reference numerals refer to like features.

DETAILED DESCRIPTION

Figure 1:
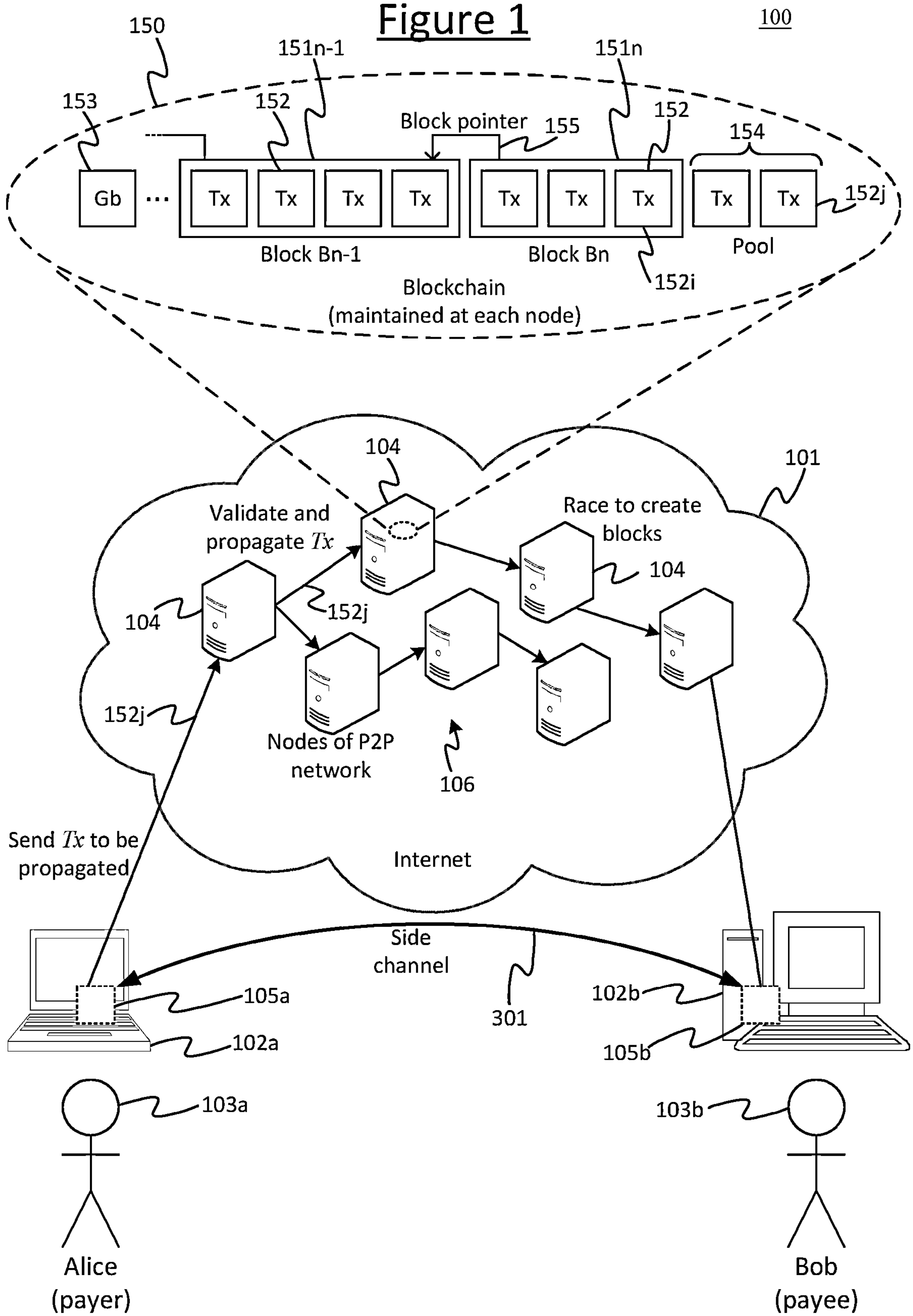
FIG. 1 depicts an example system for implementing a blockchain.

According to a first aspect, the present disclosure proposes a computer implemented method for providing proof of existence, the method comprising: (i) receiving a request comprising a data reveal path, the data reveal path referencing a node of interest within an input hierarchical data structure, (ii) obtaining the input hierarchical data structure comprising an input root node and a plurality of input nodes, wherein each of the input nodes within the input hierarchical data structure have an associated value, (iii) generating an output hierarchical data structure based on the data reveal path and the input hierarchical data structure, wherein the output hierarchical data structure comprises a plurality of output nodes, wherein each of the plurality of output nodes has an associated node in the input hierarchical data structure, wherein the plurality of output nodes comprises an output root node, and an output node of interest that is associated with the node of interest within the input hierarchical data structure, and wherein the output node of interest and each ancestor node of the output node of interest comprises a value and all other nodes in the output hierarchical data structure comprise a digest based on the associated value of the corresponding node of the input hierarchical data structure.

Advantageously, the output hierarchical data structure provides a structure that reveals only the value of interest and no other values while still enabling a proof that said value was the value used in the creation of the input hierarchical data structure. Hiding the other values improves the security of the overall system as some of the other metadata components may be sensitive (for example, might contain information like which user submitted said data or when said data was submitted).

Optionally, a digest associated with the input root node and a digest associated with the output root node are the same. Optionally, validity of the node of interest is determined based on a comparison of the input root node and the output root node.

Advantageously, having values associated with each root node being the same allows for ease of comparison and therefore ease of verification. Further, having them both digests results in smaller sized data footprint when storing the input root node. This is particularly relevant when storing the input root node digest on the blockchain where transaction size is directly related to cost and processing time.

Optionally, the method further comprises the step of, recording data based on the input root node on a blockchain. Preferably, the data based on the root node of the input hierarchical data structure is a digest based on the input root node.

Advantageously, storing data based on the input root node on the blockchain enables third parties to trust, in a trust-less environment, that said the data based on the input root node has not changed since it was recorded on the blockchain (i.e. when the input hierarchical data structure was created when the original client data was received) thereby increasing the security and reliability of the system when it comes to verification. The blockchain provides an immutable, permanent, and tamper-proof storage system for any data.

Optionally, the output node corresponding to the data reveal path and all ancestor nodes of the output node corresponding to the data reveal path of the output hierarchical data structure further comprise a salt. Preferably, the salt is based on a randomly generated value.

Advantageously, salting the data provides resistance to "rainbow table" attacks thereby increasing the security of the data structure and the data stored therein. Salting based on a randomly generated value adds further security by making it even harder to construct rainbow tables—were the salt to be known and predicted, a rainbow could be calculated using said known or predicted salt value. Using the same salt for the entire input hierarchical data structure saves on storage space on the off-chain data store.

Preferably, each salt is based on a path of its associated node. More preferably, each salt is a digest based on the randomly generated value and the path of its associated node. Preferably, the salt is based on a path and/or the randomly generated value in an irreversible manner such that the randomly generated value cannot be reversed.

Advantageously, basing each salt on the path provides a method of adding further defence against rainbow attacks as even if somehow a malicious third party were able to reverse one of the hashes in the output hierarchical data structure (something exceedingly unlikely), and obtain the value and the pathSalt, the malicious party would still not know the salt and therefore would need to reverse a further hash to obtain the salt. This therefore adds security to the data structure by making reversing any elements of it harder. During selective disclosure, salts (and in particular pathSalts) can be revealed without opening up un-disclosed nodes to brute-force attacks. For example, with a single salt for the whole structure, the attacker could combine it with guessed values for a node that has only the digest revealed until they find a match Optionally, the step of generating the output hierarchical data structure comprises: starting with the root node of the input hierarchical data structure and walking through the input data structure, for each node in the input hierarchical data structure walked over, if said node is the node of interest and/or an ancestor thereof, a value based on said node of the input hierarchical data structure is inserted in the output hierarchical data structure at the same corresponding location and if not, a digest based on said node of the input hierarchical data structure is inserted in the output hierarchical data structure at the same corresponding location.

Optionally, the step of generating the output hierarchical data structure comprises: starting with the root node of the input hierarchical data structure as the current node: (a) determining whether the current node is a node of interest and/or an ancestor of a node of interest, and if so: producing a node in the output hierarchical data structure comprising a value associated with the current node, and conduct step (a) above with each child of the current node as the current node of the next iteration; and if not: producing a node in the output hierarchical data structure comprising a digest based on the value associated with the current node.

Optionally, the step of generating the output hierarchical data structure comprises: for each given node in the input data structure, starting with the root node, performing the following steps (i) based on a determination that the given node is a node of interest and/or an ancestor thereof, inserting a value based on the given node at a location in the output hierarchical data that corresponds to its location in the input data structure; or (ii) based on a determination that the given node is not a node of interest and/or an ancestor thereof, inserting a digest based on a value of the given node at a location in the output hierarchical data that corresponds to its location in the input data structure.

Advantageously, contracting the input data structure in this manner provides protection from traffic analysis of the output data.

Advantageously, the above discussed methods provides a one-pass way to create the output hierarchical data structure. The methods are one-pass in that each node is only accessed/walked/visited once to create the tree structure. This provides an efficient way to create the data structure.

Optionally, the request comprises one or more data reveal paths wherein each data reveal path references a node of interest and wherein each node of interest and all ancestors of the nodes of interest in the output hierarchical data structure comprise a value and all other nodes in the output hierarchical data structure comprise a digest.

Advantageously, requests comprising multiple data reveal paths provide a way to reduce network traffic as multiple requests are no longer needed. Further, when it comes to using the output hierarchical data structure for verification, the total number of digests needed to be calculated to calculate the root will likely be less. This is because if multiple output hierarchical data structures are used, it's likely the same digests of the same nodes will be calculated multiple times. Whereas if it is in one data structure, the nodes need only be calculated once.

Optionally, the hierarchical data structure and/or the output hierarchical data structure is represented using a JSON object. Preferably, the JSON object has a canonical format.

Advantageously, JSON provides a defined/specified, flexible, and inherently hierarchical data format to represent hierarchical data structures. Further, JSON provides a way to serialize said hierarchical data structures such that they can be transmitted and received in given formats. Providing a canonical format of JSON (or of any data format used to represent the hierarchical data structures) ensures that the same digest calculations are made with the correct data types/formats. This is important as the same digests need to be generated for verification as with validation. Canonicalization provides a way to ensure this occurs every time and prevents the need to try different data types to try arrive at the correct format used in generation.

Optionally, each node of the output hierarchical data structure, except for leaf nodes, is a Merkle tree root such that a digest for each node can be calculated based on digests of its child nodes.

Optionally, the value of the ancestor nodes of the output node of interest is based on its child nodes. Optionally, the value of the ancestor nodes of the output node of interest is, comprises, or has an associated digest that is based on its child nodes. More preferably, the digest that is based on a string encoded Merkle root hash of all of the digests of its child nodes. Optionally, the value of the ancestor nodes of the output node is: a digest that is based on its child nodes is a string encoded Merkle root hash of all of the digests of its child nodes, or a representation of its child nodes such that the digest can be calculated.

Advantageously, Merkle tree roots for each non-leaf node provide a way to selectively disclose any arbitrary depth and/or path from the input hierarchical data structure. Thereby increasing the flexibility of the system.

Optionally, the method further comprises the step of transmitting the output hierarchical data structure. Preferably, the output hierarchical data structure is transmitted to a sender of the request.

Advantageously, providing the output hierarchical data structure allows third parties to validate given data without need to rely on any other parties, even the party generating the output hierarchical data structures.

Optionally, the digest of each node of the output hierarchical data structure that comprises a digest obliviates or redacts a value and/or data associated with the node.

Advantageously, digests allow for the provider of the output hierarchical data structure to hide any arbitrary data from the user receiving the output hierarchical data structure. This thereby increases the security and flexibility of the system without compromising on the ability for a verifier to verify securely and without trusting the creator of the output hierarchical data structure.

Also according to the first aspect, the present disclosure proposes a device configured to undertake the method of the first aspect.

Also according to the first aspect, the present disclosure proposes a computer program product comprising instructions which, when the program is executed by a computer, cause the computer to carry out the method of the first aspect.

Also according to the first aspect, the present disclosure proposes a system comprising: a client device, and a device according to the device of the first aspect discussed above, wherein the client device is configured generate a request comprising a data reveal path and transmit it to said device.

Preferably, the client device is as described with reference to the second aspect.

Optionally, the request further comprises an animal unique identifier and an event description. Optionally, the step of obtaining the input hierarchical data structure is based on the animal unique identifier and the event description.

Optionally, the first data reveal path relates to a livestock related data. Preferably the first data reveal path relates to a vaccination event of an animal. According to a second aspect, there is provided a computer implemented method for verifying a proof of existence, the method comprising: (i) obtaining an input root digest from a blockchain, (ii) obtaining a data reveal path, the data reveal path referencing a node of interest within an input hierarchical data structure, (iii) obtaining an output hierarchical data structure comprising plurality of nodes and wherein each of the plurality of nodes correspond to a node within the input hierarchical data structure, (iv) calculating a digest for the node of the output hierarchical data structure corresponding to the data reveal path, (v) calculating a digest associated with each ancestor of the node corresponding to the data reveal path until there are no more ancestor nodes, and wherein the top most digest is an output root digest, and (vi) verifying the node of interest's value based on a comparison with the input root digest and the output root digest.

Advantageously, according to this method, the verifier can the verify that the value at the data reveal path was the same value as used in generation of the input root digest. This can be conducted in a manner that does not require trust to be established with the provider of the output hierarchical data structure. If any value other than the real one is provided, then the verification will come back as invalid. This provides a high level of security without needing a high level of trust on parties that are storing the data.

Optionally, the data reveal path is transmitted to a server and the output hierarchical data structure is received from the server comprising a value associated with the data reveal path.

Advantageously, this provides flexibility in the system in that the called can arbitrarily choose which data they wish to request.

Optionally, the input root digest is obtained from a blockchain. Preferably, the input root value is stored on a transaction output of a transaction stored on the blockchain. More preferably, the method further comprises further confirming that the transaction was stored on the blockchain.

As discussed above, the blockchain further increases the security of the system by providing an immutable, permanent, and tamper-proof data storage.

Preferably, the step of confirming that the transaction was stored on the blockchain comprises obtaining a Merkle proof comprising data based on the transaction and verifying that the transaction was stored on the blockchain using the Merkle proof.

Similar to the point above, security can be further increased through use of Merkle proof of inclusions to determine that the correct data has been stored on the blockchain. Said Merkle proofs require only block headers to verify that given transactions are part of the blockchain thereby reducing the total space needed on the verifying device.

Optionally, the digest for each node is based on a value of the node and a salt.

As discussed above, salting the digest increases resistance to rainbow attacks and therefore increases the security of the system overall.

Also according to the second aspect, the present disclosure proposes a device configured to undertake the method of the second aspect.

Also according to the second aspect, the present disclosure proposes a computer program product comprising instructions which, when the program is executed by a computer, cause the computer to carry out the method of the second aspect.

Also according to the second aspect, the present disclosure proposes a system comprising a client device according to the second aspect, and a further device (preferably according to the first aspect), wherein the client device is configured generate a request comprising a data reveal path and transmit it to the further device.

Optionally, the data reveal path relates to a livestock related event. Preferably the data reveal path relates to a vaccination event of an animal.

According to a third aspect, there is provided, a computer implemented method for generating and storing a representation of client data item associated with a set of data items, the method comprising: (i) receiving a request comprising client data relating to the current state, (ii) obtaining a set of child nodes, wherein the child nodes are based on the following: the client data; metadata relating to the client data; a first reference to a previous data item in the set of data items; and a second reference to a next data item in the set of data items, (iii) generating a hierarchical data structure based on the plurality of child nodes, wherein the hierarchical data structure comprises a root nodes, wherein the majority of the child nodes are obtained in advance of generation of the hierarchical data structure, and (iv) storing the root node for later recall.

Optionally, the majority of the child nodes are obtained in advance of reception of the client data.

Advantageously, by recognising that certain child nodes (and/or the value thereof) can be determined in advance, much of the content hierarchical data structure can be pre-generated and therefore when the time critical section of generation of the root node needs to be conducted, much of the data is already there saving time overall. Thereby improving overall data throughput of the system.

Optionally, the hierarchical data structure is based on a Merkle tree.

Advantageously, use of a Merkle tree enables the child node to be prepared through hashing its associated value. This leaves the final step of generating the root node as merely the gathering of said digests and calculating the root. This ensures that the synchronisation point of the method is as short as possible.

Optionally, the set of child nodes comprises a node based on a secret value of the current transaction. Optionally, the set of child nodes comprises a node based on a secret value of the next transaction.

Advantageously, using secrets of the current and the next value provides a further way to link transactions to each other on the blockchain. Using the next secret (secretN+1) on the current transaction allows for extra verification steps to ensure that the next transaction in the set of transactions is correct and valid.

Optionally, the set of child nodes comprises a node based on a transaction outpoint of the next transaction. Preferably, the set of child nodes comprises a node based on an index of the transaction outpoint of the next transaction and a node based on a transaction id of the transaction outpoint of the next transaction.

Advantageously, using the transaction outpoint as a reference to the next transaction enables the next transaction to be referenced, even though the client data to create the transaction is not known yet. This allows for this step to be done in advance of any next client data or even the current client data. As discussed above, conducting more steps in advance of the final synchronisation point of generating the root node enables improved processing speed.

Optionally, the set of child nodes comprises a node based on a root digest of a previous hierarchical data structure associated with the previous transaction.

Advantageously, this can also be calculated in advance and as it is a digest already, it does not even need to be hashed again for inclusion in the hierarchical data structure thereby increasing speed of processing the current transaction further still.

Optionally, the set of child nodes comprises a node based on a hash of the client data.

Advantageously, using data representative of the client data in the creation of the hierarchical data structure enables it to later be verified by an interested party. Preferably, the data representative of the client data is constructed as a Merkle tree thereby enabling selective disclosure of any element within the tree as described with reference to the first and second aspects.

Optionally, the method further comprises the step of generating the root node of the hierarchical data structure and wherein the generation of the root node of the hierarchical data structure is a synchronisation point.

Optionally, obtaining each child node in the set of child nodes is conducted concurrently. Obtaining preferably comprises obtaining corresponding input data for each node and processing said corresponding data. Preferably, processing comprises preparing a digest based on said corresponding data.

Advantageously, constructing a hierarchical data structure such that each node is independent of one another (or at least as much as possible the nodes are independent of each other) enables each node to be obtained concurrently. Concurrent and independent process enables more effective horizontal scaling thereby providing an easier method of increasing data throughput.

Optionally, a plurality of requests comprising client data are received and output hierarchical data structures are generated for each request.

The improved horizontal scaling through design and recognition of independent child data inputs (that still allows the chain of commitments as described herein to operate securely and correctly) allows for more concurrent processing not only of the child nodes relating to a single received request, but also enables concurrent processing across multiple received requests. Thus, even if a first received request has not been completed yet, processing can already start on a second received request (except for, for example, the reference to the previous transaction which does require the digest of the previous request).

Optionally, the root node is stored on a blockchain.

As set out previously, by storing the root node (which in relation to the first and second aspects, is the input root node) on the blockchain provides an immutable data store for trust-less verification.

Optionally, the child nodes are children of the root node.

Also according to the third aspect, the present disclosure proposes a device configured to undertake the method of the third aspect.

Also according to the third aspect, the present disclosure proposes a computer program product comprising instructions which, when the program is executed by a computer, cause the computer to carry out the method of the third aspect.

Also according to the third aspect, the present disclosure proposes a system comprising a device according to the third aspect, and a client device, wherein the client device is configured to transmit client data to the device.

According to a fourth aspect, the present disclosure proposes methods, systems, and devices for secure verification of livestock related data using the methods, devices, and systems of the first, second, and third aspects. Preferably, the fourth aspect provides a system for secure verification of livestock related data, comprising a verifier device according to the second aspect, and a server according to first aspect, wherein the verifier device is configured to receive the output hierarchical data structure from the server and wherein the output hierarchical data structure comprises data relating to livestock management.

Example System Overview

FIG. 1 shows an example system 100 for implementing a blockchain 150. The system 100 may comprise of a packet-switched network 101, typically a wide-area internetwork such as the Internet. The packet-switched network 101 comprises a plurality of blockchain nodes 104 that may be arranged to form a peer-to-peer (P2P) network 106 within the packet-switched network 101. Whilst not illustrated, the blockchain nodes 104 may be arranged as a near-complete graph. Each blockchain node 104 is therefore highly connected to other blockchain nodes 104.

Each blockchain node 104 comprises computer equipment of a peer, with different ones of the nodes 104 belonging to different peers. Each blockchain node 104 comprises processing apparatus comprising one or more processors, e.g. one or more central processing units (CPUs), accelerator processors, application specific processors and/or field programmable gate arrays (FPGAs), and other equipment such as Application Specific Integrated Circuits (ASICs). Each node also comprises memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive.

The blockchain 150 comprises a chain of blocks of data 151, wherein a respective copy of the blockchain 150 is maintained at each of a plurality of blockchain nodes 104 in the distributed or blockchain network 160. As mentioned above, maintaining a copy of the blockchain 150 does not necessarily mean storing the blockchain 150 in full. Instead, the blockchain 150 may be pruned of data so long as each blockchain node 150 stores the blockheader (discussed below) of each block 151. Each block 151 in the chain comprises one or more transactions 152, wherein a transaction in this context refers to a kind of data structure. The nature of the data structure will depend on the type of transaction protocol used as part of a transaction model or scheme. A given blockchain will use one particular transaction protocol throughout. In one common type of transaction protocol, the data structure of each transaction 152 comprises at least one input and at least one output. Each output specifies an amount representing a quantity of a digital asset as property, an example of which is a user 103 to whom the output is cryptographically locked (requiring a signature or other solution of that user in order to be unlocked and thereby redeemed or spent). Each input points back to the output of a preceding transaction 152, thereby linking the transactions.

Each block 151 also comprises a block pointer 155 pointing back to the previously created block 151 in the chain so as to define a sequential order to the blocks 151.

Each transaction 152 (other than a coinbase transaction) comprises a pointer back to a previous transaction so as to define an order to sequences of transactions (N.B. sequences of transactions 152 are allowed to branch). The chain of blocks 151 goes all the way back to a genesis block (Gb) 153 which was the first block in the chain. One or more original transactions 152 early on in the chain 150 pointed to the genesis block 153 rather than a preceding transaction.

Each of the blockchain nodes 104 is configured to forward transactions 152 to other blockchain nodes 104, and thereby cause transactions 152 to be propagated throughout the network 106. Each blockchain node 104 is configured to create blocks 151 and to store a respective copy of the same blockchain 150 in their respective memory. Each blockchain node 104 also maintains an ordered set 154 of transactions 152 waiting to be incorporated into blocks 151. The ordered set 154 is often referred to as a "mempool". This term herein is not intended to limit to any particular blockchain, protocol or model. It refers to the ordered set of transactions which a node 104 has accepted as valid and for which the node 104 is obliged not to accept any other transactions attempting to spend the same output.

In a given present transaction 152*j*, the (or each) input comprises a pointer referencing the output of a preceding transaction 152*i* in the sequence of transactions, specifying that this output is to be redeemed or "spent" in the present transaction 152*j*. In general, the preceding transaction could be any transaction in the ordered set 154 or any block 151. The preceding transaction 152*i* need not necessarily exist at the time the present transaction 152*j* is created or even sent to the network 106, though the preceding transaction 152*i* will need to exist and be validated in order for the present transaction to be valid. Hence "preceding" herein refers to a predecessor in a logical sequence linked by pointers, not necessarily the time of creation or sending in a temporal sequence, and hence it does not necessarily exclude that the transactions 152*i*, 152*j* be created or sent out-of-order (see discussion below on orphan transactions). The preceding transaction 152*i* could equally be called the antecedent or predecessor transaction.

The input of the present transaction 152*j* also comprises the input authorisation, for example the signature of the user 103*a* to whom the output of the preceding transaction 152*i* is locked. In turn, the output of the present transaction 152*j* can be cryptographically locked to a new user or entity 103*b*. The present transaction 152*j* can thus transfer the amount defined in the input of the preceding transaction 152*i* to the new user or entity 103*b* as defined in the output of the present transaction 152*j*. In some cases a transaction 152 may have multiple outputs to split the input amount between multiple users or entities (one of whom could be the original user or entity 103*a* in order to give change). In some cases a transaction can also have multiple inputs to gather together the amounts from multiple outputs of one or more preceding transactions, and redistribute to one or more outputs of the current transaction.

According to an output-based transaction protocol such as bitcoin, when an entity, such as a user or machine, 103 wishes to enact a new transaction 152*j*, then the entity sends the new transaction from its computer terminal 102 to a recipient. The entity or the recipient will eventually send this transaction to one or more of the blockchain nodes 104 of the network 106 (which nowadays are typically servers or data centres, but could in principle be other user terminals). It is also not excluded that the entity 103 enacting the new transaction 152*j* could send the transaction to one or more of the blockchain nodes 104 and, in some examples, not to the recipient. A blockchain node 104 that receives a transaction checks whether the transaction is valid according to a blockchain node protocol which is applied at each of the blockchain nodes 104. The blockchain node protocol typically requires the blockchain node 104 to check that a cryptographic signature in the new transaction 152*j* matches the expected signature, which depends on the previous transaction 152*i* in an ordered sequence of transactions 152. In such an output-based transaction protocol, this may comprise checking that the cryptographic signature or other authorisation of the entity 103 included in the input of the new transaction 152*j* matches a condition defined in the output of the preceding transaction 152*i* which the new transaction assigns, wherein this condition typically comprises at least checking that the cryptographic signature or other authorisation in the input of the new transaction 152*j* unlocks the output of the previous transaction 152*i* to which the input of the new transaction is linked to. The condition may be at least partially defined by a script included in the output of the preceding transaction 152*i*. Alternatively it could simply be fixed by the blockchain node protocol alone, or it could be due to a combination of these. Either way, if the new transaction 152*j* is valid, the blockchain node 104 forwards it to one or more other blockchain nodes 104 in the blockchain network 106. These other blockchain nodes 104 apply the same test according to the same blockchain node protocol, and so forward the new transaction 152*j* on to one or more further nodes 104, and so forth. In this way the new transaction is propagated throughout the network of blockchain nodes 104.

In an output-based model, the definition of whether a given output (e.g. UTXO) is assigned is whether it has yet been validly redeemed by the input of another, onward transaction 152*j* according to the blockchain node protocol. Another condition for a transaction to be valid is that the output of the preceding transaction 152*i* which it attempts to assign or redeem has not already been assigned/redeemed by another transaction. Again if not valid, the transaction 152*j* will not be propagated (unless flagged as invalid and propagated for alerting) or recorded in the blockchain 150. This guards against double-spending whereby the transactor tries to assign the output of the same transaction more than once. An account-based model on the other hand guards against double-spending by maintaining an account balance. Because again there is a defined order of transactions, the account balance has a single defined state at any one time.

In addition to validating transactions, blockchain nodes 104 also race to be the first to create blocks of transactions in a process commonly referred to as mining, which is supported by "proof-of-work". At a blockchain node 104, new transactions are added to an ordered set 154 of valid transactions that have not yet appeared in a block 151 recorded on the blockchain 150. The blockchain nodes then race to assemble a new valid block 151 of transactions 152 from the ordered set of transactions 154 by attempting to solve a cryptographic puzzle. Typically this comprises searching for a "nonce" value such that when the nonce is concatenated with a representation of the ordered set of transactions 154 and hashed, then the output of the hash meets a predetermined condition. E.g. the predetermined condition may be that the output of the hash has a certain predefined number of leading zeros. Note that this is just one particular type of proof-of-work puzzle, and other types are not excluded. A property of a hash function is that it has an unpredictable output with respect to its input. Therefore this search can only be performed by brute force, thus consuming a substantive amount of processing resource at each blockchain node 104 that is trying to solve the puzzle.

The first blockchain node 104 to solve the puzzle announces this to the network 106, providing the solution as proof which can then be easily checked by the other blockchain nodes 104 in the network (once given the solution to a hash it is straightforward to check that it causes the output of the hash to meet the condition). The first blockchain node 104 propagates a block to a threshold consensus of other nodes that accept the block and thus enforce the protocol rules. The ordered set of transactions 154 then becomes recorded as a new block 151 in the blockchain 150 by each of the blockchain nodes 104. A block pointer 155 is also assigned to the new block 151*n* pointing back to the previously created block 151*n*-1 in the chain. A significant amount of effort, for example in the form of hash, required to create a proof-of-work solution signals the intent of the first node 104 to follow the rules of the blockchain protocol. Such rules include not accepting a transaction as valid if it assigns the same output as a previously validated transaction, otherwise known as double-spending. Once created, the block 151 cannot be modified since it is recognized and maintained at each of the blockchain nodes 104 in the blockchain network 106. The block pointer 155 also imposes a sequential order to the blocks 151. Since the transactions 152 are recorded in the ordered blocks at each blockchain node 104 in a network 106, this therefore provides an immutable public ledger of the transactions.

Note that different blockchain nodes 104 racing to solve the puzzle at any given time may be doing so based on different snapshots of the ordered set of yet to be published transactions 154 at any given time, depending on when they started searching for a solution or the order in which the transactions were received. Whoever solves their respective puzzle first defines which transactions 152 are included in the next new block 151*n* and in which order, and the current set 154 of unpublished transactions is updated. The blockchain nodes 104 then continue to race to create a block from the newly defined outstanding ordered set of unpublished transactions 154, and so forth. A protocol also exists for resolving any "fork" that may arise, which is where two blockchain nodes 104 solve their puzzle within a very short time of one another such that a conflicting view of the blockchain gets propagated between nodes 104. In short, whichever prong of the fork grows the longest becomes the definitive blockchain 150. Note this should not affect the users or agents of the network as the same transactions will appear in both forks.

According to the bitcoin blockchain (and most other blockchains) a node that successfully constructs a new block 104 is granted the ability to assign an accepted amount of the digital asset in a new special kind of transaction which distributes a defined quantity of the digital asset (as opposed to an inter-agent, or inter-user transaction which transfers an amount of the digital asset from one agent or user to another). This special type of transaction is usually referred to as a "coinbase transaction", but may also be termed an "initiation transaction". It typically forms the first transaction of the new block 151*n*. The proof-of-work signals the intent of the node that constructs the new block to follow the protocol rules allowing this special transaction to be redeemed later. The blockchain protocol rules may require a maturity period, for example 100 blocks, before this special transaction may be redeemed. Often a regular (non-generation) transaction 152 will also specify an additional transaction fee in one of its outputs, to further reward the blockchain node 104 that created the block 151*n* in which that transaction was published. This fee is normally referred to as the "transaction fee", and is discussed blow.

Due to the resources involved in transaction validation and publication, typically at least each of the blockchain nodes 104 takes the form of a server comprising one or more physical server units, or even whole a data centre. However in principle any given blockchain node 104 could take the form of a user terminal or a group of user terminals networked together.

The memory of each blockchain node 104 stores software configured to run on the processing apparatus of the blockchain node 104 in order to perform its respective role or roles and handle transactions 152 in accordance with the blockchain node protocol. It will be understood that any action attributed herein to a blockchain node 104 may be performed by the software run on the processing apparatus of the respective computer equipment. The node software may be implemented in one or more applications at the application layer, or a lower layer such as the operating system layer or a protocol layer, or any combination of these.

Also connected to the network 101 is the computer equipment 102 of each of a plurality of parties 103 in the role of consuming users. These users may interact with the blockchain network but do not participate in validating, constructing or propagating transactions and blocks. Some of these users or agents 103 may act as senders and recipients in transactions. Other users may interact with the blockchain 150 without necessarily acting as senders or recipients. For instance, some parties may act as storage entities that store a copy of the blockchain 150 (e.g. having obtained a copy of the blockchain from a blockchain node 104).

Some or all of the parties 103 may be connected as part of a different network, e.g. a network overlaid on top of the blockchain network 106. Users of the blockchain network (often referred to as "clients") may be said to be part of a system that includes the blockchain network; however, these users are not blockchain nodes 104 as they do not perform the roles required of the blockchain nodes. Instead, each party 103 may interact with the blockchain network 106 and thereby utilize the blockchain 150 by connecting to (i.e. communicating with) a blockchain node 106. Two parties 103 and their respective equipment 102 are shown for illustrative purposes: a first party 103*a* and his/her respective computer equipment 102*a*, and a second party 103*b* and his/her respective computer equipment 102*b*. It will be understood that many more such parties 103 and their respective computer equipment 102 may be present and participating in the system 100, but for convenience they are not illustrated. Each party 103 may be an individual or an organization. Purely by way of illustration the first party 103*a* is referred to herein as Alice and the second party 103*b* is referred to as Bob, but it will be appreciated that this is not limiting and any reference herein to Alice or Bob may be replaced with "first party" and "second "party" respectively.

The computer equipment 102 of each party 103 comprises respective processing apparatus comprising one or more processors, e.g. one or more CPUs, GPUs, other accelerator processors, application specific processors, and/or FPGAs. The computer equipment 102 of each party 103 further comprises memory, i.e. computer-readable storage in the form of a non-transitory computer-readable medium or media. This memory may comprise one or more memory units employing one or more memory media, e.g. a magnetic medium such as hard disk; an electronic medium such as an SSD, flash memory or EEPROM; and/or an optical medium such as an optical disc drive. The memory on the computer equipment 102 of each party 103 stores software comprising a respective instance of at least one client application 105 arranged to run on the processing apparatus. It will be understood that any action attributed herein to a given party 103 may be performed using the software run on the processing apparatus of the respective computer equipment 102. The computer equipment 102 of each party 103 comprises at least one user terminal, e.g. a desktop or laptop computer, a tablet, a smartphone, or a wearable device such as a smartwatch. The computer equipment 102 of a given party 103 may also comprise one or more other networked resources, such as cloud computing resources accessed via the user terminal.

The client application 105 may be initially provided to the computer equipment 102 of any given party 103 on suitable computer-readable storage medium or media, e.g. downloaded from a server, or provided on a removable storage device such as a removable SSD, flash memory key, removable EEPROM, removable magnetic disk drive, magnetic floppy disk or tape, optical disk such as a CD or DVD ROM, or a removable optical drive, etc.

The client application 105 comprises at least a "wallet" function. This has two main functionalities. One of these is to enable the respective party 103 to create, authorise (for example sign) and send transactions 152 to one or more bitcoin nodes 104 to then be propagated throughout the network of blockchain nodes 104 and thereby included in the blockchain 150. The other is to report back to the respective party the amount of the digital asset that he or she currently owns. In an output-based system, this second functionality comprises collating the amounts defined in the outputs of the various 152 transactions scattered throughout the blockchain 150 that belong to the party in question.

Note: whilst the various client functionality may be described as being integrated into a given client application 105, this is not necessarily limiting and instead any client functionality described herein may instead be implemented in a suite of two or more distinct applications, e.g. interfacing via an API, or one being a plug-in to the other. More generally the client functionality could be implemented at the application layer or a lower layer such as the operating system, or any combination of these. The following will be described in terms of a client application 105 but it will be appreciated that this is not limiting.

The instance of the client application or software 105 on each computer equipment 102 is operatively coupled to at least one of the blockchain nodes 104 of the network 106. This enables the wallet function of the client 105 to send transactions 152 to the network 106. The client 105 is also able to contact blockchain nodes 104 in order to query the blockchain 150 for any transactions of which the respective party 103 is the recipient (or indeed inspect other parties' transactions in the blockchain 150, since in embodiments the blockchain 150 is a public facility which provides trust in transactions in part through its public visibility). The wallet function on each computer equipment 102 is configured to formulate and send transactions 152 according to a transaction protocol. As set out above, each blockchain node 104 runs software configured to validate transactions 152 according to the blockchain node protocol, and to forward transactions 152 in order to propagate them throughout the blockchain network 106. The transaction protocol and the node protocol correspond to one another, and a given transaction protocol goes with a given node protocol, together implementing a given transaction model. The same transaction protocol is used for all transactions 152 in the blockchain 150. The same node protocol is used by all the nodes 104 in the network 106.

When a given party 103, say Alice, wishes to send a new transaction **152*j* to be included in the blockchain 150, then she formulates the new transaction in accordance with the relevant transaction protocol (using the wallet function in her client application 105). She then sends the transaction 152 from the client application 105 to one or more blockchain nodes 104 to which she is connected. E.g. this could be the blockchain node 104 that is best connected to Alice's computer 102. When any given blockchain node 104 receives a new transaction 152*j*, it handles it in accordance with the blockchain node protocol and its respective role. This comprises first checking whether the newly received transaction 152*j* meets a certain condition for being "valid", examples of which will be discussed in more detail shortly. In some transaction protocols, the condition for validation may be configurable on a per-transaction basis by scripts included in the transactions 152**. Alternatively the condition could simply be a built-in feature of the node protocol, or be defined by a combination of the script and the node protocol.

On condition that the newly received transaction **152*j* passes the test for being deemed valid (i.e. on condition that it is "validated"), any blockchain node 104 that receives the transaction 152*j* will add the new validated transaction 152 to the ordered set of transactions 154 maintained at that blockchain node 104. Further, any blockchain node 104 that receives the transaction 152*j* will propagate the validated transaction 152 onward to one or more other blockchain nodes 104 in the network 106. Since each blockchain node 104 applies the same protocol, then assuming the transaction 152*j* is valid, this means it will soon be propagated throughout the whole network 106**.

Once admitted to the ordered set of transactions 154 maintained at a given blockchain node 104, that blockchain node 104 will start competing to solve the proof-of-work puzzle on the latest version of their respective ordered set of transactions 154 including the new transaction 152 (recall that other blockchain nodes 104 may be trying to solve the puzzle based on a different ordered set of transactions154, but whoever gets there first will define the ordered set of transactions that are included in the latest block 151. Eventually a blockchain node 104 will solve the puzzle for a part of the ordered set 154 which includes Alice's transaction **152*j*). Once the proof-of-work has been done for the ordered set 154 including the new transaction 152*j*, it immutably becomes part of one of the blocks 151 in the blockchain 150. Each transaction 152** comprises a pointer back to an earlier transaction, so the order of the transactions is also immutably recorded.

Different blockchain nodes 104 may receive different instances of a given transaction first and therefore have conflicting views of which instance is 'valid' before one instance is published in a new block 151, at which point all blockchain nodes 104 agree that the published instance is the only valid instance. If a blockchain node 104 accepts one instance as valid, and then discovers that a second instance has been recorded in the blockchain 150 then that blockchain node 104 must accept this and will discard (i.e. treat as invalid) the instance which it had initially accepted (i.e. the one that has not been published in a block 151).

An alternative type of transaction protocol operated by some blockchain networks may be referred to as an "account-based" protocol, as part of an account-based transaction model. In the account-based case, each transaction does not define the amount to be transferred by referring back to the UTXO of a preceding transaction in a sequence of past transactions, but rather by reference to an absolute account balance. The current state of all accounts is stored, by the nodes of that network, separate to the blockchain and is updated constantly. In such a system, transactions are ordered using a running transaction tally of the account (also called the "position"). This value is signed by the sender as part of their cryptographic signature and is hashed as part of the transaction reference calculation. In addition, an optional data field may also be signed the transaction. This data field may point back to a previous transaction, for example if the previous transaction ID is included in the data field.

UTXO-Based Model

Figure 2:
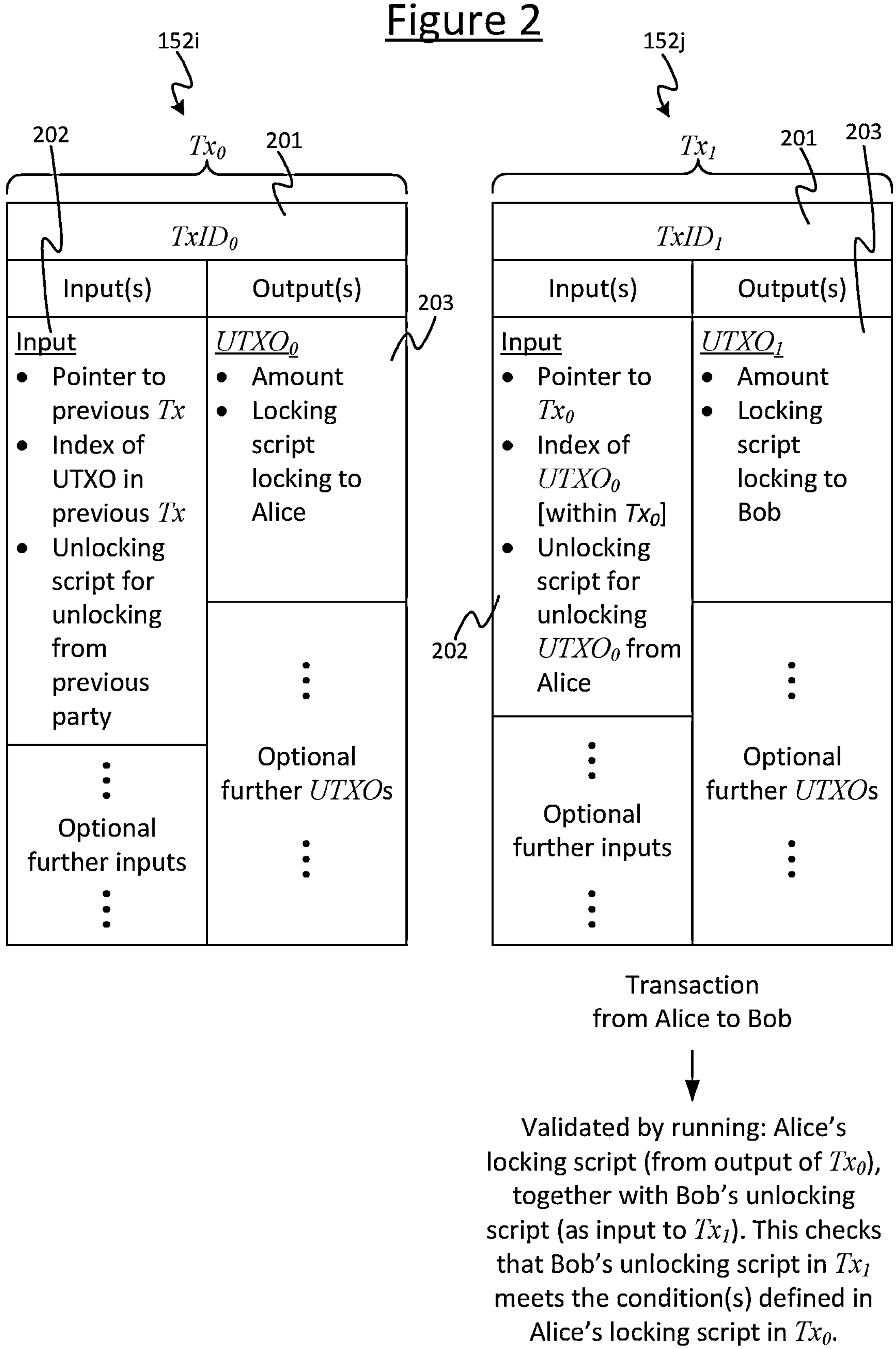
FIG. 2 illustrates an example transaction protocol.

FIG. 2 illustrates an example transaction protocol. This is an example of a UTXO-based protocol. A transaction 152 (abbreviated "Tx") is the fundamental data structure of the blockchain 150 (each block 151 comprising one or more transactions 152). The following will be described by reference to an output-based or "UTXO" based protocol. However, this is not limiting to all possible embodiments. Note that while the example UTXO-based protocol is described with reference to bitcoin, it may equally be implemented on other example blockchain networks.

In a UTXO-based model, each transaction ("Tx") 152 comprises a data structure comprising one or more inputs 202, and one or more outputs 203. Each output 203 may comprise an unspent transaction output (UTXO), which can be used as the source for the input 202 of another new transaction (if the UTXO has not already been redeemed). The UTXO includes a value specifying an amount of a digital asset. This represents a set number of tokens on the distributed ledger. The UTXO may also contain the transaction ID of the transaction from which it came, amongst other information. The transaction data structure may also comprise a header 201, which may comprise an indicator of the size of the input field(s) 202 and output field(s) 203. The header 201 may also include an ID of the transaction. In embodiments the transaction ID is the hash of the transaction data (excluding the transaction ID itself) and stored in the header 201 of the raw transaction 152 submitted to the nodes 104.

Say Alice 103*a* wishes to create a transaction 152*j* transferring an amount of the digital asset in question to Bob 103*b*. In FIG. 2 Alice's new transaction 152*j* is labelled "$Tx_1$". It takes an amount of the digital asset that is locked to Alice in the output 203 of a preceding transaction 152*i* in the sequence, and transfers at least some of this to Bob. The preceding transaction 152*i* is labelled "$Tx_0$" in FIG. 2. $Tx_0$ and $Tx_1$ are just arbitrary labels. They do not necessarily mean that $Tx_0$ is the first transaction in the blockchain 151, nor that $Tx_1$ is the immediate next transaction in the pool 154. $Tx_1$ could point back to any preceding (i.e. antecedent) transaction that still has an unspent output 203 locked to Alice.

The preceding transaction $Tx_0$ may already have been validated and included in a block 151 of the blockchain 150 at the time when Alice creates her new transaction $Tx_1$, or at least by the time she sends it to the network 106. It may already have been included in one of the blocks 151 at that time, or it may be still waiting in the ordered set 154 in which case it will soon be included in a new block 151. Alternatively $Tx_0$ and $Tx_1$ could be created and sent to the network 106 together, or $Tx_0$ could even be sent after $Tx_1$ if the node protocol allows for buffering "orphan" transactions. The terms "preceding" and "subsequent" as used herein in the context of the sequence of transactions refer to the order of the transactions in the sequence as defined by the transaction pointers specified in the transactions (which transaction points back to which other transaction, and so forth). They could equally be replaced with "predecessor" and "successor", or "antecedent" and "descendant", "parent" and "child", or such like. It does not necessarily imply an order in which they are created, sent to the network 106, or arrive at any given blockchain node 104. Nevertheless, a subsequent transaction (the descendent transaction or "child") which points to a preceding transaction (the antecedent transaction or "parent") will not be validated until and unless the parent transaction is validated. A child that arrives at a blockchain node 104 before its parent is considered an orphan. It may be discarded or buffered for a certain time to wait for the parent, depending on the node protocol and/or node behaviour.

One of the one or more outputs 203 of the preceding transaction $Tx_0$ comprises a particular UTXO, labelled here $UTXO_0$. Each UTXO comprises a value specifying an amount of the digital asset represented by the UTXO, and a locking script which defines a condition which must be met by an unlocking script in the input 202 of a subsequent transaction in order for the subsequent transaction to be validated, and therefore for the UTXO to be successfully redeemed. Typically the locking script locks the amount to a particular party (the beneficiary of the transaction in which it is included). I.e. the locking script defines an unlocking condition, typically comprising a condition that the unlocking script in the input of the subsequent transaction comprises the cryptographic signature of the party to whom the preceding transaction is locked.

The locking script (aka scriptPubKey) is a piece of code written in the domain specific language recognized by the node protocol. A particular example of such a language is called "Script" (capital S) which is used by the blockchain network. The locking script specifies what information is required to spend a transaction output 203, for example the requirement of Alice's signature. Unlocking scripts appear in the outputs of transactions. The unlocking script (aka scriptSig) is a piece of code written the domain specific language that provides the information required to satisfy the locking script criteria. For example, it may contain Bob's signature. Unlocking scripts appear in the input 202 of transactions.

So in the example illustrated, $UTXO_0$ in the output 203 of $Tx_0$ comprises a locking script [Checksig $P_A$] which requires a signature Sig $P_A$ of Alice in order for $UTXO_0$ to be redeemed (strictly, in order for a subsequent transaction attempting to redeem UTXO, to be valid). [Checksig $P_A$] contains a representation (i.e. a hash) of the public key $P_A$ from a public-private key pair of Alice. The input 202 of $Tx_1$ comprises a pointer pointing back to $Tx_1$ (e.g. by means of its transaction ID, $TxID_0$, which in embodiments is the hash of the whole transaction $Tx_0$). The input 202 of $Tx_1$ comprises an index identifying $UTXO_0$ within $Tx_0$, to identify it amongst any other possible outputs of $Tx_0$. The input 202 of $Tx_1$ further comprises an unlocking script <Sig $P_A$> which comprises a cryptographic signature of Alice, created by Alice applying her private key from the key pair to a predefined portion of data (sometimes called the "message" in cryptography). The data (or "message") that needs to be signed by Alice to provide a valid signature may be defined by the locking script, or by the node protocol, or by a combination of these.

When the new transaction $Tx_1$ arrives at a blockchain node 104, the node applies the node protocol. This comprises running the locking script and unlocking script together to check whether the unlocking script meets the condition defined in the locking script (where this condition may comprise one or more criteria). In embodiments this involves concatenating the two scripts:

<Sig $P_A$><$P_A$>||[Checksig $P_A$]

where "||" represents a concatenation and "< . . . >" means place the data on the stack, and "[ . . . ]" is a function comprised by the locking script (in this example a stack-based language). Equivalently the scripts may be run one after the other, with a common stack, rather than concatenating the scripts. Either way, when run together, the scripts use the public key $P_A$ of Alice, as included in the locking script in the output of $Tx_0$, to authenticate that the unlocking script in the input of $Tx_1$ contains the signature of Alice signing the expected portion of data. The expected portion of data itself (the "message") also needs to be included in order to perform this authentication. In embodiments the signed data comprises the whole of $Tx_1$ (so a separate element does not need to be included specifying the signed portion of data in the clear, as it is already inherently present).

The details of authentication by public-private cryptography will be familiar to a person skilled in the art. Basically, if Alice has signed a message using her private key, then given Alice's public key and the message in the clear, another entity such as a node 104 is able to authenticate that the message must have been signed by Alice. Signing typically comprises hashing the message, signing the hash, and tagging this onto the message as a signature, thus enabling any holder of the public key to authenticate the signature. Note therefore that any reference herein to signing a particular piece of data or part of a transaction, or such like, can in embodiments mean signing a hash of that piece of data or part of the transaction.

If the unlocking script in $Tx_1$ meets the one or more conditions specified in the locking script of $Tx_0$ (so in the example shown, if Alice's signature is provided in $Tx_1$ and authenticated), then the blockchain node 104 deems $Tx_1$ valid. This means that the blockchain node 104 will add $Tx_1$ to the ordered set of transactions 154. The blockchain node 104 will also forward the transaction $Tx_1$ to one or more other blockchain nodes 104 in the network 106, so that it will be propagated throughout the network 106. Once $Tx_1$ has been validated and included in the blockchain 150, this defines $UTXO_0$ from $Tx_0$ as spent. Note that $Tx_1$ can only be valid if it spends an unspent transaction output 203. If it attempts to spend an output that has already been spent by another transaction 152, then 7×1 will be invalid even if all the other conditions are met. Hence the blockchain node 104 also needs to check whether the referenced UTXO in the preceding transaction $Tx_0$ is already spent (i.e. whether it has already formed a valid input to another valid transaction). This is one reason why it is important for the blockchain 150 to impose a defined order on the transactions 152. In practice a given blockchain node 104 may maintain a separate database marking which UTXOs 203 in which transactions 152 have been spent, but ultimately what defines whether a UTXO has been spent is whether it has already formed a valid input to another valid transaction in the blockchain 150.

If the total amount specified in all the outputs 203 of a given transaction 152 is greater than the total amount pointed to by all its inputs 202, this is another basis for invalidity in most transaction models. Therefore such transactions will not be propagated nor included in a block 151.

Note that in UTXO-based transaction models, a given UTXO needs to be spent as a whole. It cannot "leave behind" a fraction of the amount defined in the UTXO as spent while another fraction is spent. However the amount from the UTXO can be split between multiple outputs of the next transaction. E.g. the amount defined in $UTXO_0$ in $Tx_0$ can be split between multiple UTXOs in $Tx_1$. Hence if Alice does not want to give Bob all of the amount defined in $UTXO_0$, she can use the remainder to give herself change in a second output of $Tx_1$, or pay another party.

In practice Alice will also usually need to include a fee for the bitcoin node that publishes her transaction 104. If Alice does not include such a fee, Tx may be rejected by the blockchain nodes 104, and hence although technically valid, may not be propagated and included in the blockchain 150 (the node protocol does not force blockchain nodes 104 to accept transactions 152 if they don't want). In some protocols, the transaction fee does not require its own separate output 203 (i.e. does not need a separate UTXO). Instead any difference between the total amount pointed to by the input(s) 202 and the total amount of specified in the output(s) 203 of a given transaction 152 is automatically given to the blockchain node 104 publishing the transaction. E.g. say a pointer to $UTXO_0$ is the only input to $Tx_1$, and $Tx_1$ has only one output $UTXO_1$. If the amount of the digital asset specified in $UTXO_0$ is greater than the amount specified in $UTXO_1$, then the difference may be assigned by the node 104 that publishes the block containing $UTXO_1$. Alternatively or additionally however, it is not necessarily excluded that a transaction fee could be specified explicitly in its own one of the UTXOs 203 of the transaction 152.

Alice and Bob's digital assets consist of the UTXOs locked to them in any transactions 152 anywhere in the blockchain 150. Hence typically, the assets of a given party 103 are scattered throughout the UTXOs of various transactions 152 throughout the blockchain 150. There is no one number stored anywhere in the blockchain 150 that defines the total balance of a given party 103. It is the role of the wallet function in the client application 105 to collate together the values of all the various UTXOs which are locked to the respective party and have not yet been spent in another onward transaction. It can do this by querying the copy of the blockchain 150 as stored at any of the bitcoin nodes 104.

Note that the script code is often represented schematically (i.e. not using the exact language). For example, one may use operation codes (opcodes) to represent a particular function. "OP_. . . " refers to a particular opcode of the Script language. As an example, OP_RETURN is an opcode of the Script language that when preceded by OP_FALSE at the beginning of a locking script creates an unspendable output of a transaction that can store data within the transaction, and thereby record the data immutably in the blockchain 150. E.g. the data could comprise a document which it is desired to store in the blockchain.

Typically an input of a transaction contains a digital signature corresponding to a public key $P_A$. In embodiments this is based on the ECDSA using the elliptic curve secp256k1. A digital signature signs a particular piece of data. In some embodiments, for a given transaction the signature will sign part of the transaction input, and some or all of the transaction outputs. The particular parts of the outputs it signs depends on the SIGHASH flag. The SIGHASH flag is usually a 4-byte code included at the end of a signature to select which outputs are signed (and thus fixed at the time of signing).

The locking script is sometimes called "scriptPubKey" referring to the fact that it typically comprises the public key of the party to whom the respective transaction is locked. The unlocking script is sometimes called "scriptSig" referring to the fact that it typically supplies the corresponding signature. However, more generally it is not essential in all applications of a blockchain 150 that the condition for a UTXO to be redeemed comprises authenticating a signature. More generally the scripting language could be used to define any one or more conditions. Hence the more general terms "locking script" and "unlocking script" may be preferred.

As shown in FIG. 1, the client application on each of Alice and Bob's computer equipment 102*a*, 120*b*, respectively, may comprise additional communication functionality. This additional functionality enables Alice 103*a* to establish a separate side channel 301 with Bob 103*b* (at the instigation of either party or a third party). The side channel 301 enables exchange of data separately from the blockchain network. Such communication is sometimes referred to as "off-chain" communication. For instance this may be used to exchange a transaction 152 between Alice and Bob without the transaction (yet) being registered onto the blockchain network 106 or making its way onto the chain 150, until one of the parties chooses to broadcast it to the network 106. Sharing a transaction in this way is sometimes referred to as sharing a "transaction template". A transaction template may lack one or more inputs and/or outputs that are required in order to form a complete transaction. Alternatively or additionally, the side channel 301 may be used to exchange any other transaction related data, such as keys, negotiated amounts or terms, data content, etc.

The side channel 301 may be established via the same packet-switched network 101 as the blockchain network 106. Alternatively or additionally, the side channel 301 may be established via a different network such as a mobile cellular network, or a local area network such as a local wireless network, or even a direct wired or wireless link between Alice and Bob's devices 102*a*, 102*b*. Generally, the side channel 301 as referred to anywhere herein may comprise any one or more links via one or more networking technologies or communication media for exchanging data "off-chain", i.e. separately from the blockchain network 106. Where more than one link is used, then the bundle or collection of off-chain links as a whole may be referred to as the side channel 301. Note therefore that if it is said that Alice and Bob exchange certain pieces of information or data, or such like, over the side channel 301, then this does not necessarily imply all these pieces of data have to be send over exactly the same link or even the same type of network.

Client Software

Figure 3A:
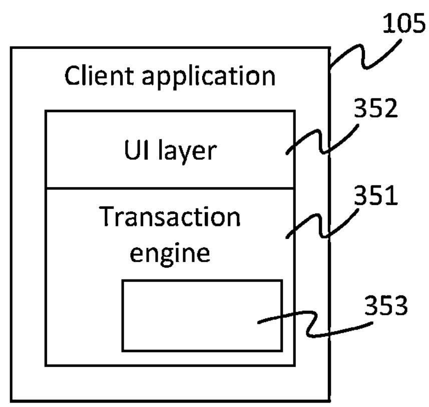
FIGS. 3A and 3B illustrate an example implementation of the client application and its user interface.

FIG. 3A illustrates an example implementation of the client application 105 for implementing embodiments of the presently disclosed scheme. The client application 105 comprises a transaction engine 351 and a user interface (UI) layer 352. The transaction engine 351 is configured to implement the underlying transaction-related functionality of the client 105, such as to formulate transactions 152, receive and/or send transactions and/or other data over the side channel 301, and/or send transactions to one or more nodes 104 to be propagated through the blockchain network 106, in accordance with the schemes discussed above and as discussed in further detail shortly. In accordance with embodiments disclosed herein, the transaction engine 351 of each client 105 comprises a function 353 . . . .

The UI layer 352 is configured to render a user interface via a user input/output (I/O) means of the respective user's computer equipment 102, including outputting information to the respective user 103 via a user output means of the equipment 102, and receiving inputs back from the respective user 103 via a user input means of the equipment 102. For example the user output means could comprise one or more display screens (touch or non-touch screen) for providing a visual output, one or more speakers for providing an audio output, and/or one or more haptic output devices for providing a tactile output, etc. The user input means could comprise for example the input array of one or more touch screens (the same or different as that/those used for the output means); one or more cursor-based devices such as mouse, trackpad or trackball; one or more microphones and speech or voice recognition algorithms for receiving a speech or vocal input; one or more gesture-based input devices for receiving the input in the form of manual or bodily gestures; or one or more mechanical buttons, switches or joysticks, etc.

Note: whilst the various functionality herein may be described as being integrated into the same client application 105, this is not necessarily limiting and instead they could be implemented in a suite of two or more distinct applications, e.g. one being a plug-in to the other or interfacing via an API (application programming interface). For instance, the functionality of the transaction engine 351 may be implemented in a separate application than the UI layer 352, or the functionality of a given module such as the transaction engine 351 could be split between more than one application. Nor is it excluded that some or all of the described functionality could be implemented at, say, the operating system layer. Where reference is made anywhere herein to a single or given application 105, or such like, it will be appreciated that this is just by way of example, and more generally the described functionality could be implemented in any form of software.

Figure 3B:
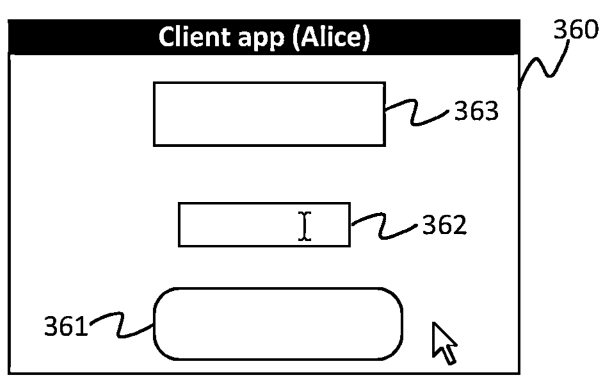

FIG. 3B gives a mock-up of an example of the user interface (UI) 360 which may be rendered by the UI layer 352 of the client application 105*a* on Alice's equipment 102*a*. It will be appreciated that a similar UI may be rendered by the client 105*b* on Bob's equipment 102*b*, or that of any other party.

By way of illustration FIG. 3B shows the UI 360 from Alice's perspective. The UI 360 may comprise one or more UI elements 362, 362, 363 rendered as distinct UI elements via the user output means.

For example, the UI elements may comprise one or more user-selectable elements 362 which may be, such as different on-screen buttons, or different options in a menu, or such like. The user input means is arranged to enable the user 103 (in this case Alice 103*a*) to select or otherwise operate one of the options, such as by clicking or touching the UI element on-screen, or speaking a name of the desired option (N.B. the term "manual" as used herein is meant only to contrast against automatic, and does not necessarily limit to the use of the hand or hands).

Alternatively or additionally, the UI elements may comprise one or more data entry fields 362, through which the user can . . . . These data entry fields are rendered via the user output means, e.g. on-screen, and the data can be entered into the fields through the user input means, e.g. a keyboard or touchscreen. Alternatively the data could be received orally for example based on speech recognition.

Alternatively or additionally, the UI elements may comprise one or more information elements 363 output to output information to the user. E.g. this/these could be rendered on screen or audibly.

It will be appreciated that the particular means of rendering the various UI elements, selecting the options and entering data is not material. The functionality of these UI elements will be discussed in more detail shortly. It will also be appreciated that the UI 360 shown in FIG. 3 is only a schematized mock-up and in practice it may comprise one or more further UI elements, which for conciseness are not illustrated.

Node Software

Figure 4:
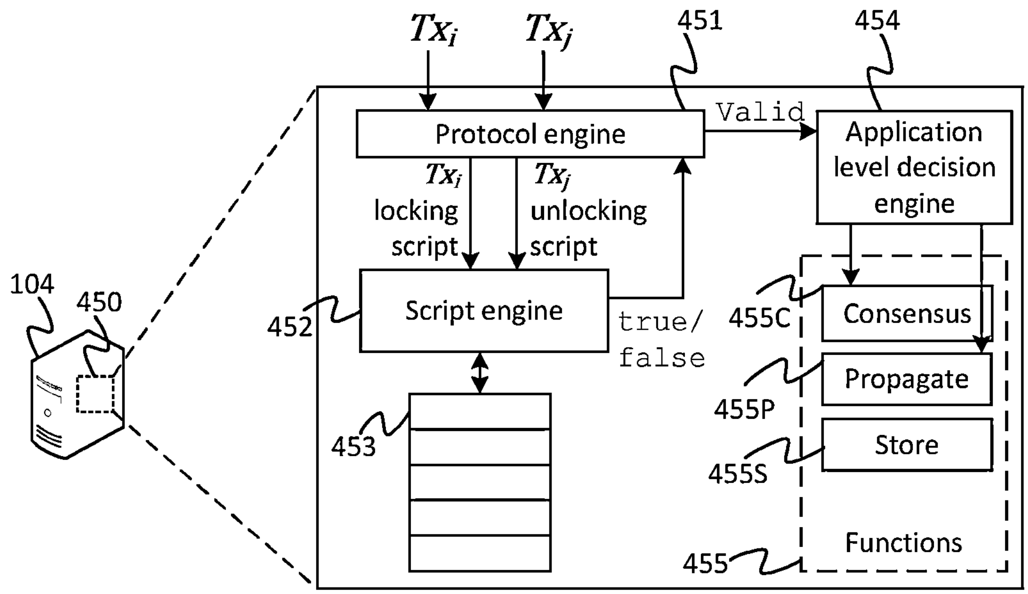
FIG. 4 illustrates an example of the node software that is run on each blockchain node of the network.

FIG. 4 illustrates an example of the node software 450 that is run on each blockchain node 104 of the network 106, in the example of a UTXO- or output-based model. Note that another entity may run node software 450 without being classed as a node 104 on the network 106, i.e. without performing the actions required of a node 104. The node software 450 may contain, but is not limited to, a protocol engine 451, a script engine 452, a stack 453, an application-level decision engine 454, and a set of one or more blockchain-related functional modules 455. Each node 104 may run node software that contains, but is not limited to, all three of: a consensus module 455C (for example, proof-of-work), a propagation module 455P and a storage module 455S (for example, a database). The protocol engine 351 is typically configured to recognize the different fields of a transaction 152 and process them in accordance with the node protocol. When a transaction 152*j* ($Tx_j$) is received having an input pointing to an output (e.g. UTXO) of another, preceding transaction 152*i* ($Tx_{m-1}$), then the protocol engine 451 identifies the unlocking script in $Tx_j$ and passes it to the script engine 452. The protocol engine 451 also identifies and retrieves $Tx_i$ based on the pointer in the input of $Tx_j$. $Tx_i$ may be published on the blockchain 150, in which case the protocol engine may retrieve $Tx_i$ from a copy of a block 151 of the blockchain 150 stored at the node 104. Alternatively, $Tx_i$ may yet to have been published on the blockchain 150. In that case, the protocol engine 451 may retrieve $Tx_i$ from the ordered set 154 of unpublished transactions maintained by the node104. Either way, the script engine 451 identifies the locking script in the referenced output of $Tx_i$ and passes this to the script engine 452.

The script engine 452 thus has the locking script of $Tx_i$ and the unlocking script from the corresponding input of $Tx_j$. For example, transactions labelled $Tx_0$ and $Tx_1$ are illustrated in FIG. 2, but the same could apply for any pair of transactions. The script engine 452 runs the two scripts together as discussed previously, which will include placing data onto and retrieving data from the stack 453 in accordance with the stack-based scripting language being used (e.g. Script).

By running the scripts together, the script engine 452 determines whether or not the unlocking script meets the one or more criteria defined in the locking script—i.e. does it "unlock" the output in which the locking script is included? The script engine 452 returns a result of this determination to the protocol engine 451. If the script engine 452 determines that the unlocking script does meet the one or more criteria specified in the corresponding locking script, then it returns the result "true". Otherwise it returns the result "false".

In an output-based model, the result "true" from the script engine 452 is one of the conditions for validity of the transaction. Typically there are also one or more further, protocol-level conditions evaluated by the protocol engine 451 that must be met as well; such as that the total amount of digital asset specified in the output(s) of $Tx_j$ does not exceed the total amount pointed to by its inputs, and that the pointed-to output of $Tx_i$ has not already been spent by another valid transaction. The protocol engine 451 evaluates the result from the script engine 452 together with the one or more protocol-level conditions, and only if they are all true does it validate the transaction $Tx_j$. The protocol engine 451 outputs an indication of whether the transaction is valid to the application-level decision engine 454. Only on condition that $Tx_j$ is indeed validated, the decision engine 454 may select to control both of the consensus module 455C and the propagation module 455P to perform their respective blockchain-related function in respect of $Tx_j$. This comprises the consensus module 455C adding $Tx_j$ to the node's respective ordered set of transactions 154 for incorporating in a block 151, and the propagation module 455P forwarding $Tx_j$ to another blockchain node 104 in the network 106. Optionally, in embodiments the application-level decision engine 454 may apply one or more additional conditions before triggering either or both of these functions. E.g. the decision engine may only select to publish the transaction on condition that the transaction is both valid and leaves enough of a transaction fee.

Note also that the terms "true" and "false" herein do not necessarily limit to returning a result represented in the form of only a single binary digit (bit), though that is certainly one possible implementation. More generally, "true" can refer to any state indicative of a successful or affirmative outcome, and "false" can refer to any state indicative of an unsuccessful or non-affirmative outcome. For instance in an account-based model, a result of "true" could be indicated by a combination of an implicit, protocol-level validation of a signature and an additional affirmative output of a smart contract (the overall result being deemed to signal true if both individual outcomes are true).

Other variants or use cases of the disclosed techniques may become apparent to the person skilled in the art once given the disclosure herein. The scope of the disclosure is not limited by the described embodiments but only by the accompanying claims.

For instance, some embodiments above have been described in terms of a bitcoin network 106, bitcoin blockchain 150 and bitcoin nodes 104. However it will be appreciated that the bitcoin blockchain is one particular example of a blockchain 150 and the above description may apply generally to any blockchain. That is, the present invention is in by no way limited to the bitcoin blockchain. More generally, any reference above to bitcoin network 106, bitcoin blockchain 150 and bitcoin nodes 104 may be replaced with reference to a blockchain network 106, blockchain 150 and blockchain node 104 respectively. The blockchain, blockchain network and/or blockchain nodes may share some or all of the described properties of the bitcoin blockchain 150, bitcoin network 106 and bitcoin nodes 104 as described above.

In preferred embodiments of the invention, the blockchain network 106 is the bitcoin network and bitcoin nodes 104 perform at least all of the described functions of creating, publishing, propagating and storing blocks 151 of the blockchain 150. It is not excluded that there may be other network entities (or network elements) that only perform one or some but not all of these functions. That is, a network entity may perform the function of propagating and/or storing blocks without creating and publishing blocks (recall that these entities are not considered nodes of the preferred bitcoin network 106).

In non-preferred embodiments of the invention, the blockchain network 106 may not be the bitcoin network. In these embodiments, it is not excluded that a node may perform at least one or some but not all of the functions of creating, publishing, propagating and storing blocks 151 of the blockchain 150. For instance, on those other blockchain networks a "node" may be used to refer to a network entity that is configured to create and publish blocks 151 but not store and/or propagate those blocks 151 to other nodes.

Even more generally, any reference to the term "bitcoin node" 104 above may be replaced with the term "network entity" or "network element", wherein such an entity/element is configured to perform some or all of the roles of creating, publishing, propagating and storing blocks. The functions of such a network entity/element may be implemented in hardware in the same way described above with reference to a blockchain node 104.

Ordered, Append-Only Data Storage

The use of the blockchain for high-volume, data-oriented applications has increased significantly in recent years. With this increase, the demand for robust layer-2 protocols for structuring, encoding and formatting the data payloads that are published to the blockchain has also increased commensurately. Here, layer-2 means secondary protocols, frameworks, data structures etc that are built on top of an existing blockchain system or systems. The aspects described herein would be considered as layer-2 protocols. Layer-1 would refer to Bitcoin, Bitcoin SV, or other underlying blockchain technologies.

It is typical for blockchain-based applications involving large amounts of data to require a data schema or structuring mechanism that allows many data-carrier transactions to be linked to one another. This is particularly pertinent to applications (e.g. in supply chains) where many events and/or data may need to be linked to each other in a linearised sequence.

The maintenance and tracking of a sequence of events and/or ordered data items can be aided by unique references, whereby one data-carrier transaction will explicitly reference another to ensure that the two transactions can be related to one another by an observer of the blockchain.

Figure 5:
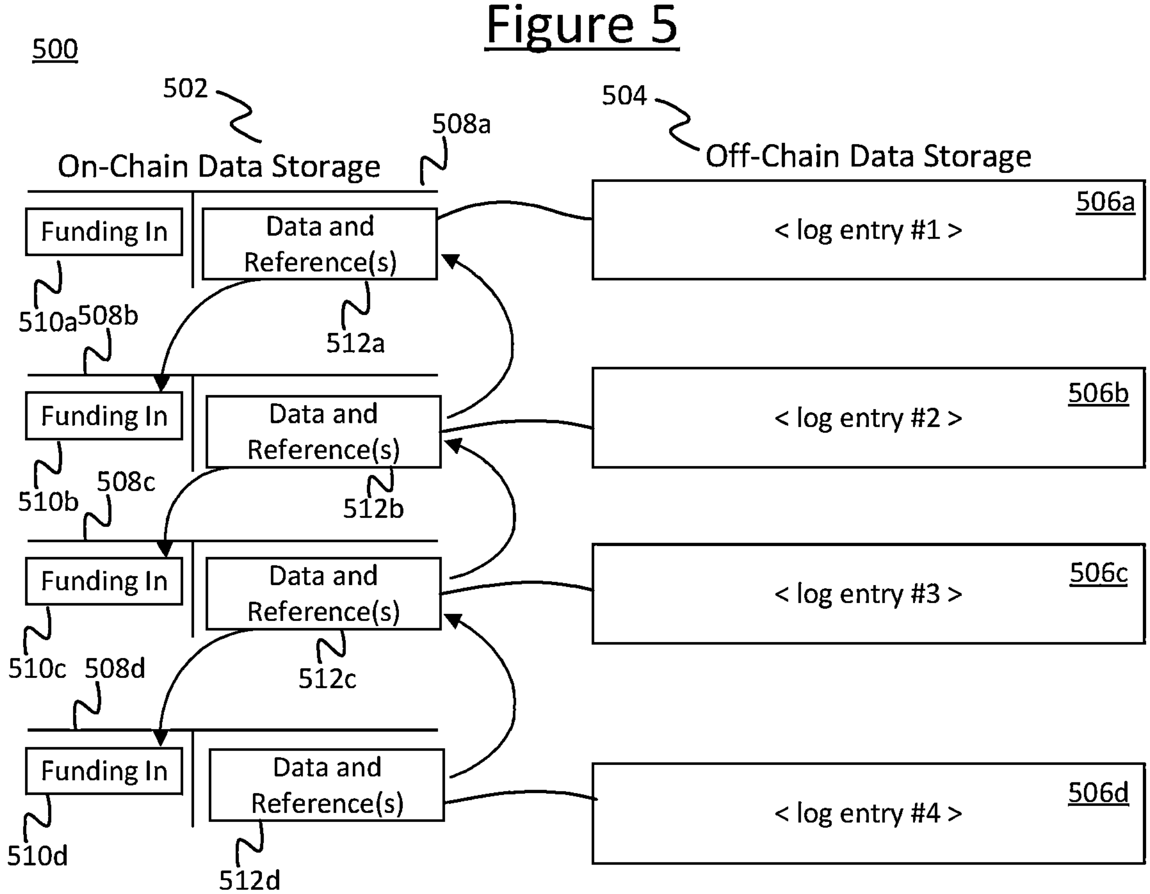
FIG. 5 is a schematic diagram depicting an overview of a chain of transactions and corresponding log entries.

FIG. 5 relates to an aspect of the present disclosure and illustrates an overview of the data structure and paradigm of an ordered, append-only data storage system. This can also be described as a data logging system. The system 500 comprises an off-chain (i.e. not on a blockchain) data storage system 504 storing a number of log entries 506*a-d*. These log entries are reflected on-chain 502 through use of blockchain transactions 508*a-d*. The off-chain data storage system is preferably a database. A skilled person will appreciate that any data storage system may be used alternatively including storage on a hard drive. Preferably, the off-chain data log is tracking a state of a system, smart contract, and/or state machine thus the system of FIG. 5 can also be described as a state storage system or state tracking system.

Figure 11:
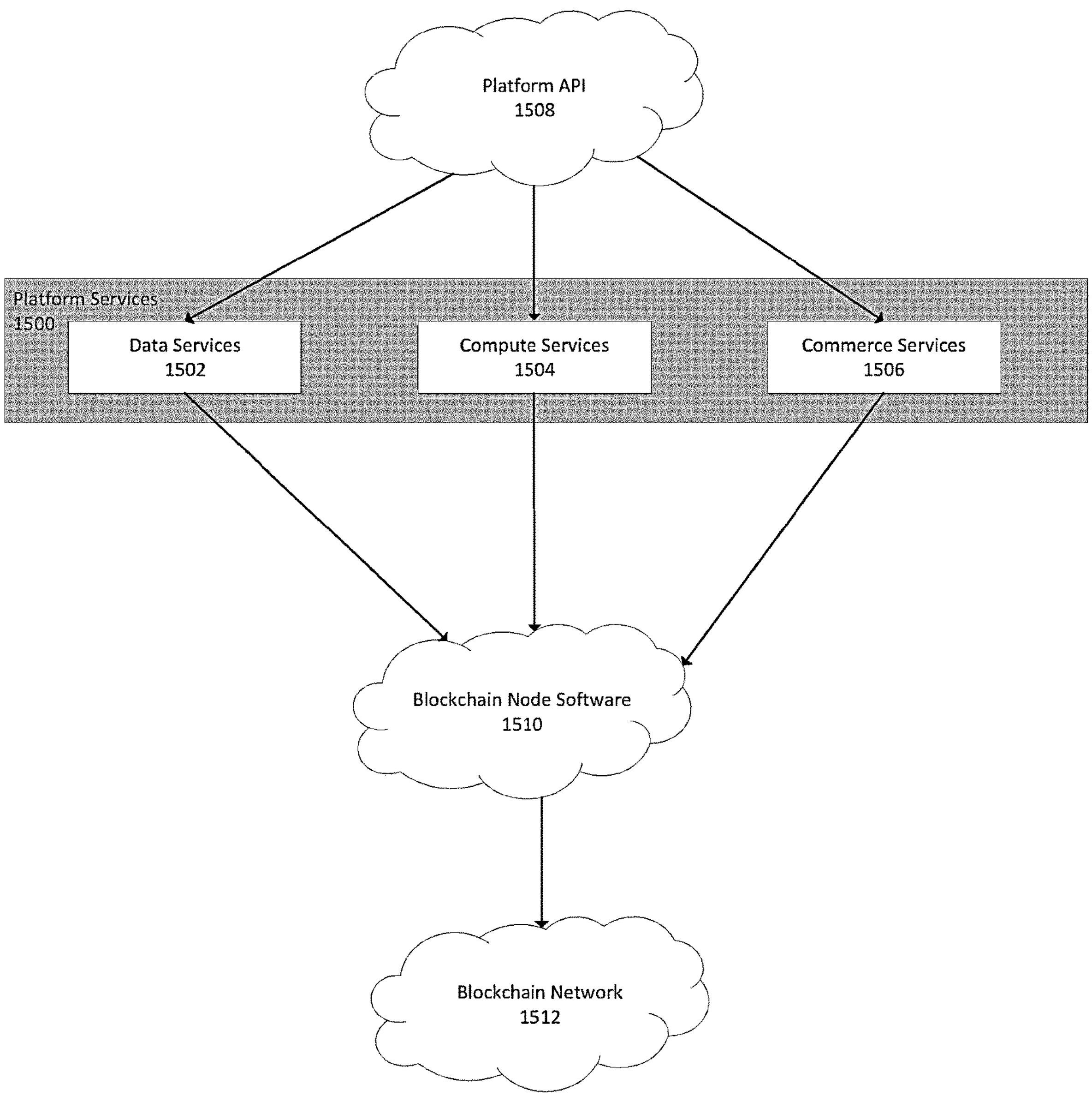
FIG. 11 is a schematic diagram, depicting an overview of a platform for a plurality of services associated with a blockchain, according to an aspect.
Figure 12:
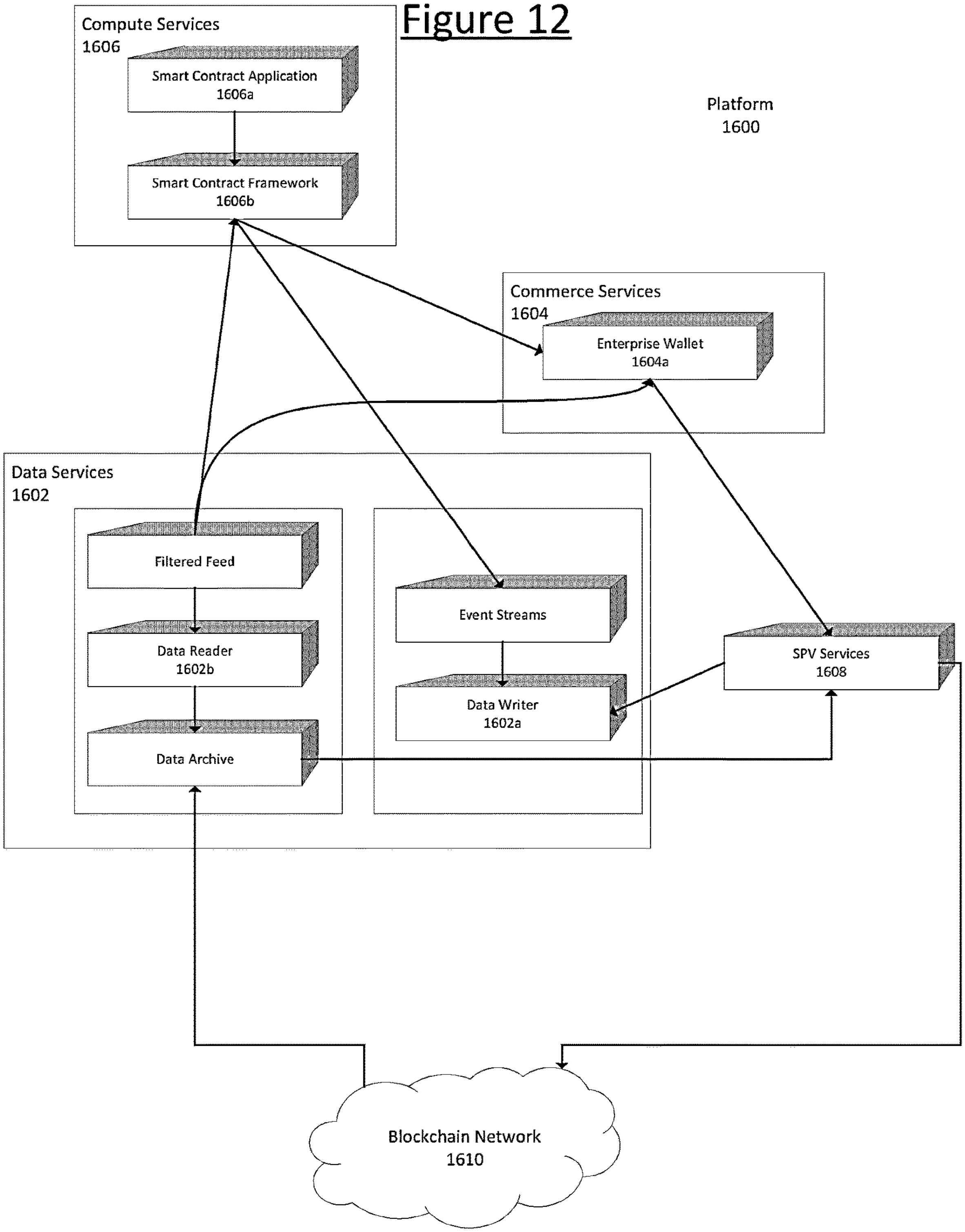
FIG. 12 is a schematic diagram, depicting the components of the platform of a plurality of services that are associated with a blockchain, according to an aspect.
Figure 13:
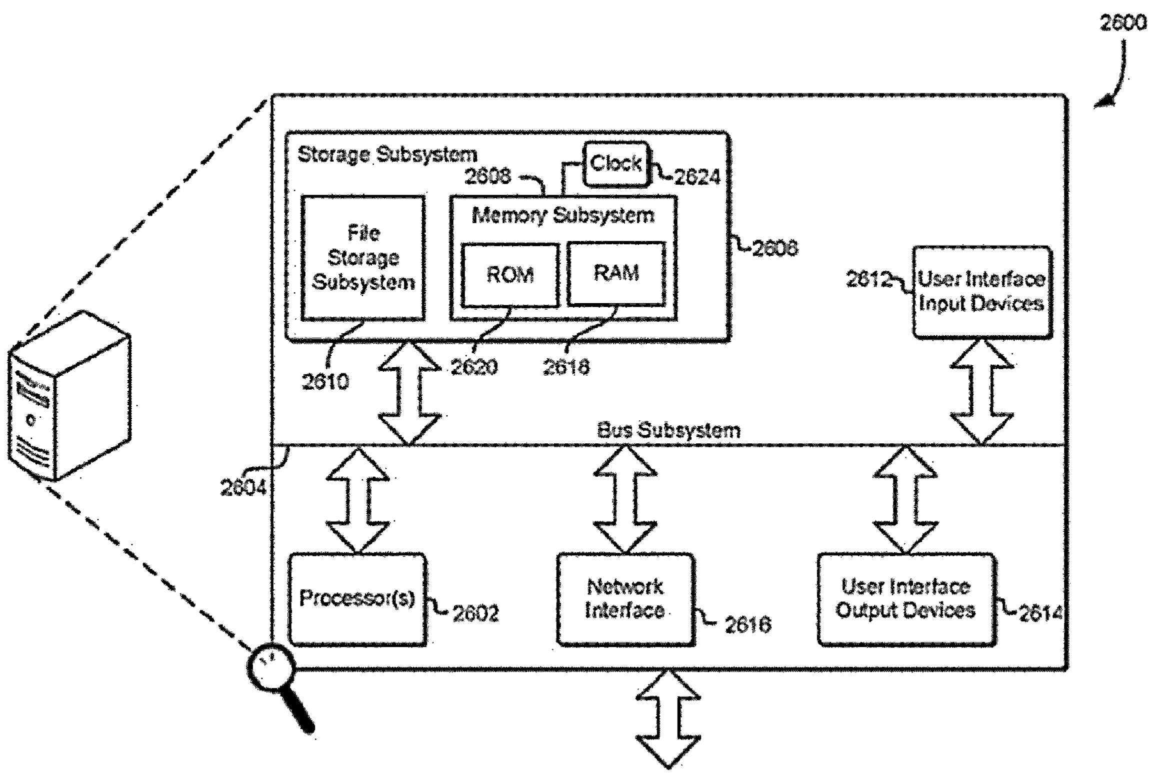
FIG. 13 is a schematic diagram, illustrating a computing environment in which various aspects and embodiments of the present disclosure can be implemented.

The system 500 of FIG. 5 is preferably used as part of an Event Stream system for logging events and/or inputs to state machines associated with Event Streams. Mapping each event to a transaction is shown as an example. Optionally only a subset of the events in the append-only log are mapped to a blockchain transaction. By way of example, the Event Stream is used throughout the specification for illustrative purposes. In particular FIGS. 11 to 13 provide specific examples of the different servers and services operating within the Event Stream system that would receive the client data, construct the transactions, and submit it to a blockchain. A skilled person will appreciate that the proposed embodiments described herein may be used with any client data items, not only those associated with an Event Stream. A skilled person will appreciate that in-order, append-only, blockchain-based, logging (or data storage) methods and systems may be used for other purposes also.

Each event 506*a-d* in the off-chain data storage 504 is mapped to a blockchain transaction 508*a-d*, and the sequence of blockchain transactions are ordered and linked using a 'chain of commitments'. A chain of commitments can be viewed as a set of transactions that comprise information such that they can be securely and verifiably associated with each other and/or traversable. As described herein, the set of transactions is constructed as a "chain" in that each transaction comprises (or comprises data that is based on) a reference to a previous transaction and a reference to a next transaction. Preferably, it is the payload 512*a-d* of each transaction that comprises or is based on a reference to a previous transaction and a next transaction.

Each transaction preferably comprises a "funding in" input 510*a-d* to pay for the transaction to be mined into a block on the blockchain. Each transaction preferably comprises a data payload 512*a-d*. The data payload is held in an un-spendable output of the transaction. Preferably the output is prepended with an OP_RETURN and/or OP_0 opcode. This is a Script opcode which can be used to write arbitrary data on a blockchain and also to mark a transaction output as invalid (i.e. un-spendable), and thereby recording the data immutably on the blockchain. Optionally, the data payload is prepended with both OP_0 and OP_RETURN Script opcodes.

Optionally, the aspects and embodiments described herein are used in addition to and/or as an augmentation to the Chain of Commitments as discussed with reference to FIGS. 5A to 13 of UK Patent Application No. 2204293.1 (filed in the name of nChain Holdings Limited on 25 Mar. 2022) and is hereby incorporated by reference. Alternatively, the embodiments are instead used standalone without coordination with the embodiments of the above referenced patent application.

Optionally, each payload 512*a-d* comprises a data item which is based on each associated event 506*a-d* as received from a client and optionally stored off-chain. Preferably, the event data has been received from a client wishing to store a representation of the event on the blockchain for later verification and/or proof of existence of the event. Preferably, the data item based on the associated event is based on a hash of the data associated with each event. Thus, the data item can also be described as a data digest. Preferably, the data digest is salted. More preferably, the event data is hashed twice. Hashing twice advantageously provides a guard against the length-extension property of the hash function. Even more preferably, the event data is hashed twice, then a preimage is generated based on the twice hashed event data and a salt. Preferably the salt is hashed and more preferably hashed twice. The preimage is then hashed. Yet still more preferably, said preimage is hashed twice. Thus, most preferably, the data digest is of the form:

$$\text{data digest}_N := H^2(H^2(D) \| H^2(\text{SALT}))$$

Where || is a concatenation of the members before and after it and H2 is a double hash function.

Hashing is provided as the main example of a one-way function herein. Hashing is also provided as the main example method of producing a digest. A person skilled in the art will appreciate that other one-way functions may also be used and other ways to generate digests may be used. Preferably in this embodiment as well as throughout the specification, the hashing function used is the SHA-256 cryptographic hash function. "Hashing", as used throughout the specification, preferably means hashing at least once and more preferably, more than once. Hashing more than once provides resistance to length extension attacks. Alternative to hashing twice (or more), a different hashing function or methodology is used that is not vulnerable to a length extension attack. For example SHA-3 and/or HMAC (optionally each item being hashed using a single salt for the entire current state as the key, or a different salt for each item being hashed as the key is used) provide such functionality.

Salting a hash preferably means to use a "salt", which is any arbitrary data, as part of the input (along with the data being hashed) to the hashing function. Preferably, the salt is concatenated with the other inputs to the hash function. Optionally, the salt is random.

Preferably, a different salt is chosen for each event in the Event Stream. Preferably, the salt is stored for later data verification usage. Salting a hash provides resistance to precomputed "rainbow table" based attacks thereby providing increased security for a client wishing to store potentially sensitive data on the blockchain.

The data digest can be seen as a unique fingerprint for an item of client data (that has, in the main example, been submitted to an Event Stream). By storing the data digest (as compared with the client data itself), a client using this system is able to store a proof of existence with a known consistent size (irrelevant of the size of the client data) on the blockchain without showing what the contents of the client data.

Figure 6A:
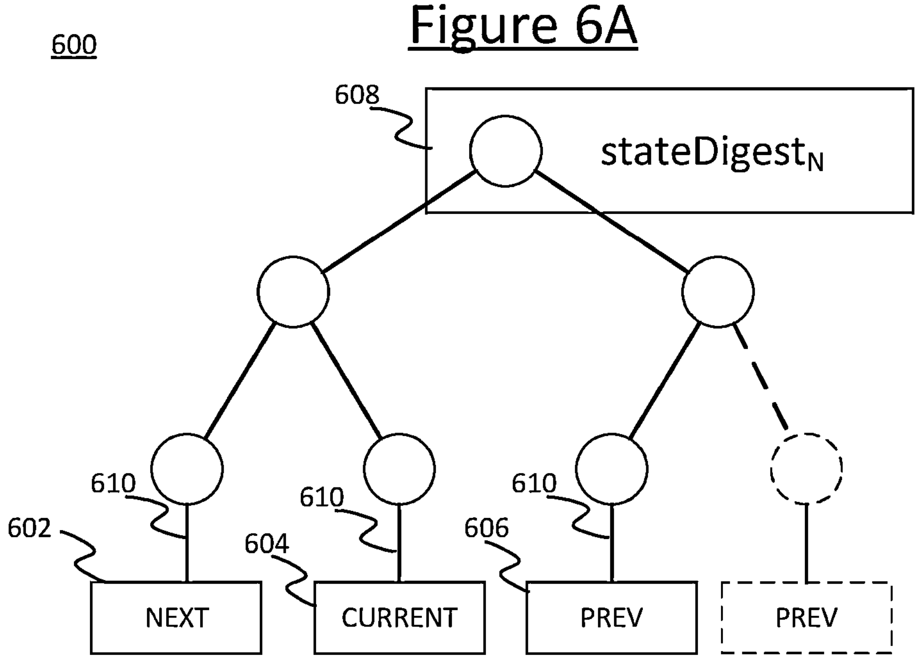
FIGS. 6A-6E are example hierarchical data structures that are generated according to aspects described herein.

Referring to FIG. 6A, a first example hierarchical data structure 600 associated with the on-chain representation of each event is shown. Preferably, the hierarchical data structure 600 is a Merkle tree. The data structure comprises a number of leaf nodes based on the following set of inputs: NEXT 602, CURRENT 604, and PREV 606. Here, the NEXT input comprises or is based on a reference to the next transaction in the chain, the CURRENT input comprises or is based on the current event state which includes received client event data and/or other metadata relating to the current event state, and the PREV input comprises data or is based on a reference to the previous transaction in the chain. Thus, it can be seen that there are a set of child nodes which are based on: client data relating to the current state and/or metadata of the current state; a first reference to a previous transaction; and a second reference to a next transaction. The three nodes shown in FIG. 6A and for illustrative purposes only. For example, there may be a number of nodes based on the current state data (one based on the client data, and one for metadata of the current state for example).

As used herein, the hierarchical data structures may also be considered proof of existence data structures.

The root 608 of the first example data structure 600 is the state digest for a current state (called $\text{StateDigest}_N$ or $S_N$ throughout the specification). Preferably a digest associated with the root is stored on the data payload of the transaction as discussed above. This example Merkle tree is constructed as a binary tree where each node has two children (except for the leaves). As there are an odd number of input data items (and thus odd number of leaves), the last unpaired leaf node is doubled. A person skilled in the art will appreciate that the strict adherence to this presented form of the Merkle tree is not necessary and there are other forms that may also work. Each item of the input set {NEXT, CURRENT, and PREV} is hashed twice 610 and each twice-hashed item is used as a leaf of the Merkle tree Preferably, a Merklize function is used to generate the Merkle tree of FIG. 6A. The function Merklize is preferably taken to mean the standard method for generating a Merkle tree given a set of leaf data items. The Merklize function can be used as such:

$$\text{stateDigest}N{:=}\text{Merklize}(\{\text{PREV},\text{CURRENT},\text{NEXT}\})$$

A Merklize function generates a Merkle root from an ordered set of data elements as leaves. As mentioned above, each of the leaves which are not already hashed are initially double hashed 610 in the Merklize function. Optionally all of the leaves are double hashed. Of note, because of how hashing and Merkle trees work, the order, layout, and format of the set of inputs to it matters. Thus, the order and layout of the inputs must be the same whenever a Merkle tree is created, recreated, or verified so that the same tree (and therefore same state digest) is generated for the same input data.

Alternative to Merkle tree structures as described with reference to the present embodiment and other embodiments described herein, a state digest can be generated by hashing a preimage where the preimage is constructed by concatenating the objects the state data is based on. Thus, in an example where the state digest is based on the previous transaction reference, the current client state data, and the next transaction reference, a formula could be of the form:

$$\text{stateDigest}N{:=}H(\text{PREV}\|\text{CURRENT}\|\text{NEXT})$$

As a further alternative to the Merkle tree structure as described with reference to the present embodiment and other embodiments described herein, a state digest can be generated by using a hash chain. A hash chain is constructed such that each intermediate hash result is prepended with an item the state digest is based on. For example, where the state digest is based on the previous transaction reference, the current state data, and the next transaction reference, a formula could be of the form:

$$\text{state Digest}N{:=}H(\text{PREV}\|H(\text{CURRENT}\|H(\text{NEXT})))$$

Figure 6B:
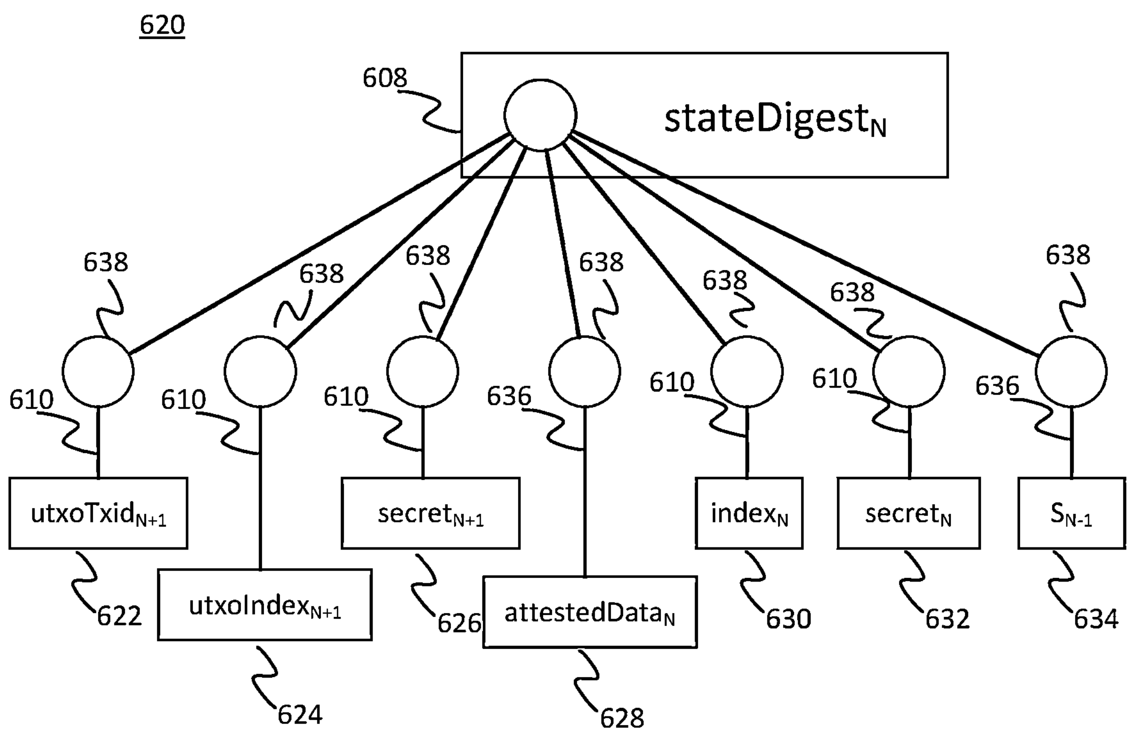

Referring to FIG. 6B, a second example hierarchical data structure 620 associated with the on-chain representation of each event is shown. The same or similar reference numerals are used to reference the same or similar objects across the current and the previous examples. Preferably, the hierarchical data structure 620 is a Merkle tree. In the current example embodiment, a number of inputs 622, 624, 626, 628, 630, 632, 634 are shown. These inputs are provided in this example such that they are associated with the NEXT 602, CURRENT 604, and PREV 606 inputs as with the previous example hierarchical data structure 600 described with reference to FIG. 6A. The NEXT input(s) are: the transaction id of the outpoint of the next transaction ($\text{utxoTxid}_{N+1}$) 622 in relation to the current transaction, the transaction output index of the outpoint of the next transaction ($\text{utxoIndex}_{N+1}$) 624 in relation to the current transaction, and the next secret ($\text{secret}_{N+1}$) which is going to be used in the generation of the next state digest ($\text{State Digest}_{N+1}$). The CURRENT input(s) are: $\text{attestedData}_N$ 628 which preferably comprises or is based on the client data submitted and other metadata associated with the client data (and more preferably, also comprises or is based on metadata of the Event Stream, and even more preferably is based on the data structures as described below with reference to FIGS. 6C and 6D), the index of the current state 630 ($\text{index}_N$), and the current secret 632 ($\text{secret}_N$). The PREV input(s) is the state digest 634 ($S_{N-1}$) of the previous event or state in the stream of events and states. A skilled person will appreciate that not all of the input nodes presented above are necessary and that a subset of them may be selected.

The exact structure of the Merkle tree is preferably consistent or at least known across different state digests such that they can be reconstructed according to the same structure at a later date. This is important for validation (or at least makes the validation easier) as discussed below under the heading "Proof of Existence Using Ordered, Append-only Data Storage".

Preferably, any input to a leaf node that is not a digest itself is hashed 610 when included as a leaf node of the Merkle tree. In some embodiments, the attestedData$_N$ 628 and the previous state digest ($S_{N-1}$) 634 are digests and thus their value can be included directly 636 without any further hashing required. As is discussed above with reference to the present embodiment and the previous one of FIG. 6A, a state digest (including previous state digests) is a Merkle tree root and thus is already a digest. As is shown below with reference to FIGS. 6C and 6D, the attestedData$_N$ is also a Merkle tree root and thus is a digest also.

For the hierarchical data structure 620 of FIG. 6B, the Merklize function may be used preferably in the following way:

$$stateDigestN := Merklize\left(\left\{\begin{matrix} utxoTxid_{N+1},\ utxoIndex_{N+1},\ secret_{N+1}, \\ attestedData_N,\ index_N,\ secret_N, \\ stateDigest_{N-1} \end{matrix}\right\}\right)$$

Where again, the Merklize function is a standard way of generating a Merkle tree from an ordered set of inputs. Preferably, the inputs are hashed where not hashed already and optionally all of the inputs are hashed.

Figure 6C:
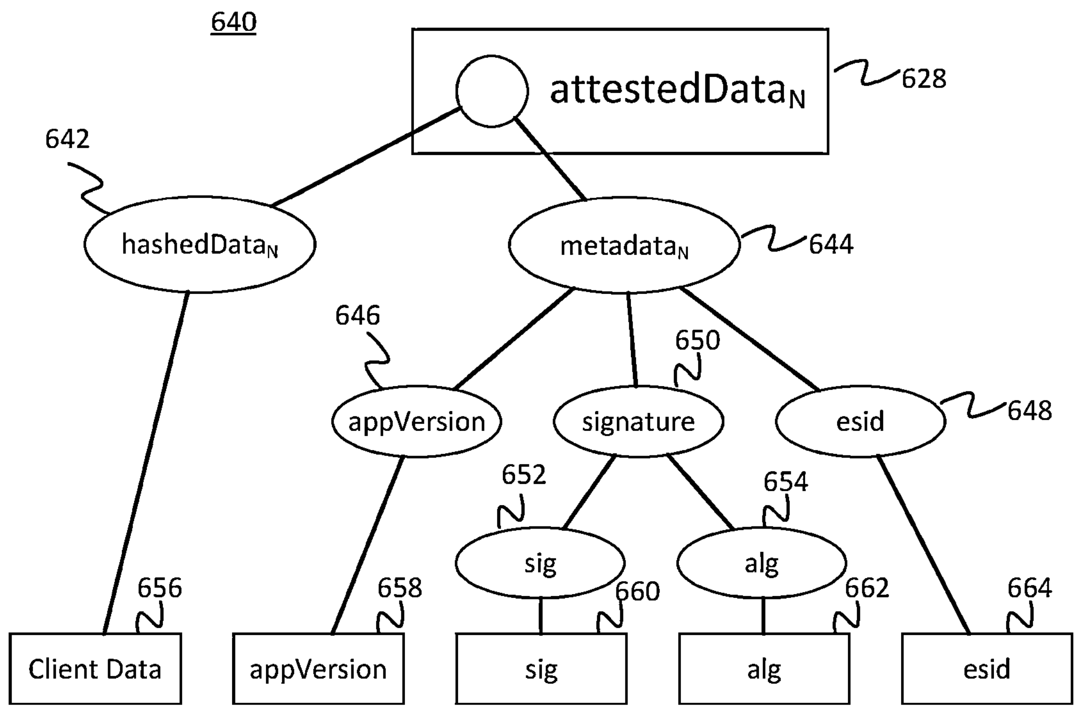

Referring to FIG. 6C, a third example hierarchical data structure 640 associated with the on-chain representation of each event is shown. Preferably, the third example hierarchical data structure is a Merkle tree. The third example hierarchical data structure comprises a root node 628 preferably called "attestedData$_N$" as the root can be used to attest any data comprised within said third example hierarchical data structure.

Preferably the third example hierarchical data structure 640 comprises a number of nodes 642, 644, 646, 648, 650, 652, 654 that are decedent of the root node and that are each based on a number in inputs 656, 658, 660, 662, 664. Preferably each of the nodes have an associated digest. Preferably, the associated digest of each leaf node is based its corresponding input data. More preferably, each of the nodes are based on a hash of each of the inputs. The non-leaf nodes (parent nodes) also have an associated digest which is based on its child nodes. Each non-leaf node has an associated value which represents their parenthood of their child nodes.

Thus, it can be seen that each node has an associated digest and has an associated value. For example, the hashedDatan node 642 is based on the client data itself 656. Preferably, the hashedDatan is obtained by hashing the client data 656. As can be seen in FIG. 6C, the digest associated with hashedDatan is salted by virtue of being based on the pathSalt. Similarly, the appVersion node 646 is based on the corresponding appVersion input value 658, the esid node 648 is based on the corresponding esid input value 664.

As is shown with the signature node 650, the present embodiment provides for arbitrary levels of hierarchy (also called layers) within the third hierarchical data structure 640. Each non-leaf node of the hierarchical data structure is preferably itself a Merkle root node based on the value and/or digest of its children. The signature node 650 comprises child nodes of itself, namely the sig 652 and alg 654 nodes which respectively are based on a signature string and a string representing an algorithm used to generate signature. The sig and alg nodes themselves are based on sig 660 and alg 660 input values. Thus, the signature node 650 is also based on the sig and alg input values. A skilled person would understand that other nodes with different input values and differing levels of depth in the third hierarchical data structure are possible.

To generate the third hierarchical data structure 640 of FIG. 6C, preferably a further Merklize function is used to handle multi-layer hierarchical data structures.

Turning to Code Block 1 below, an example input data of a particular format is shown. Code Block 1 below provides a specific example that might have been used to generate the third hierarchical data structure 640 of FIG. 6C. Thus the content of Code Block 1 can be considered a representation of a hierarchical data structure and/or comprising said hierarchical data structure. In relation to the JSON of the code blocks as used herein, each JSON Object (which comprises a key-value pair) is or represents a node.

Code Block 1 and the third hierarchical data structure comprise 4 layers: the "root" the top layer, a first child layer comprising "hashedData" and "metadata", a second child layer comprising "appVersion", "signature", and "esid" which are all children of "metadata", and finally a third child layer comprising "sig" and "alg" which are children of "signature".

Preferably, a canonicalized JSON scheme is used such that the same JSON string or representation is generated if the JSON object comprises the same content and/or is based on the same received client data. Canonicalization relates to the preservation of data types (for example storing any integer as an integer rather than a string representing an integer, or using the same encoding like Base64 for all hashes, etc) as well as preservation of the order of objects (for example, the content of "signature" in the example below should always canonically be represented with "alg" then "sig"). Comparison of a received expected value (for example as stored in a hierarchical data structure and/or a root) with a calculated value (as used in verification) depends somewhat on type. Some types (strings, numbers, booleans, nulls) have well defined JSON forms and so have industry standard means of comparison. Others types, such as binary data, dates, or out-of-range numbers may need to have an encoding agreed upon by all the devices using the systems and methods disclosed here. For example, standards such as base64 for binary data representation and ISO8601 for date representation can be used. The exact selected formats and structures used in canonicalization is not strictly important as long as it is consistent across platforms and implementations.

Ellipses (" . . . ") are used in the code blocks herein to represent elided data within the value of the key-value pair. The exact content of the data is exemplary only and a skilled person will appreciate that the data can be filled other content and even other keys comprising other data may be used.

While JSON is provided as a specific example here, a skilled person will appreciate that there are other methods of encoding hierarchical data including XML, YAML, and BSON (among others).

Code Block 1

```
inputToAttestedData = {
  "hashedData":
  "w6uP8Tcg6K2QR905Rms8iXTlksL6OD1KOWBxTK7wxPI=",
  "metadata": {
    "appVersion": "v1.0.4.30",
    "signature": {
      "alg": "ECDSA",
      "sig": "cac18b730f6f68b6 ... ac36287d8093"
```

-continued

Code Block 1

```
        },
        "esid": "eyJsIjoiZnJhb ... kVTIiwidiI6IjEifQ"
    }
        stateDigestN := MerklizeHierarchical(inputToAttestedData)
```

Example ways to perform the MerklizeHierarchical function are described with reference to FIG. 10A.

As discussed above, the input hierarchical comprises or is in a canonical format and more preferably, the canonical form is canonicalized JSON. Preferably the inputs to the Merklizehierarchcial function also have a canonical scheme (i.e. the order and format is consistent). This is important as the order in which the inputs are provided to the Merklize functions needs to be consistent across creation and verification for a verification to be valid. Preferably, the canonicalization ensures consistency if two different implementations were to implement any of the functions relating to Merklization.

Alternative to each node's digest being based on its value (i.e. as an alternative to algDigest=H ("ECDSA")), each node's digest is based on both the value and a path of the node. Preferably, the digest of a node is the hash of a canonicalized JSON string of an object that has this structure:

```
{
  path: "<string encoded path>",
  value: <value of node>,
}
```

More preferably, the digest of a node is also based on a version number and thus the digest of a node is the hash of a canonicalized JSON string of an object that has this structure:

```
{
  path: "<string encoded path>",
  value: <value of node>,
  version: <version number>,
}
```

If a node has children (such as "metadata" in Code Block 1), then said node's associated value is a digest based on the node's children. Preferably, the digest is a string encoded Merkle root hash of all of its child node's digests. Alternatively and/or in other hierarchical data structures and/or other representations of hierarchical data structures, said node's associated is a representation of the children. Optionally, both are used.

Preferably, a node having children (a parent node) is represented by a JSON Object comprising key-value pairs of JSON Objects (as with "metadata" in Code Block 1) and/or an array of JSON Objects. Preferably, a node with no children (a leaf node) is represented by a non-Object JSON type (i.e. a string, a number, a Boolean, null, or an array thereof).

The path is or comprises a value that is associated with the path of the node within the tree. Preferably the path is a string that represents the location of the node within the tree. Preferably, dot notation is used to refer to the node in the path. The dot notation is similar to the notation used in JSON. For example, "metadata.signature.sig" refers to the sig node of Code Block 1. Alternative path formats or schemes are possible also, such as an XML styled one: "<path></sig></signature></metadata></path>".

Figure 6D:
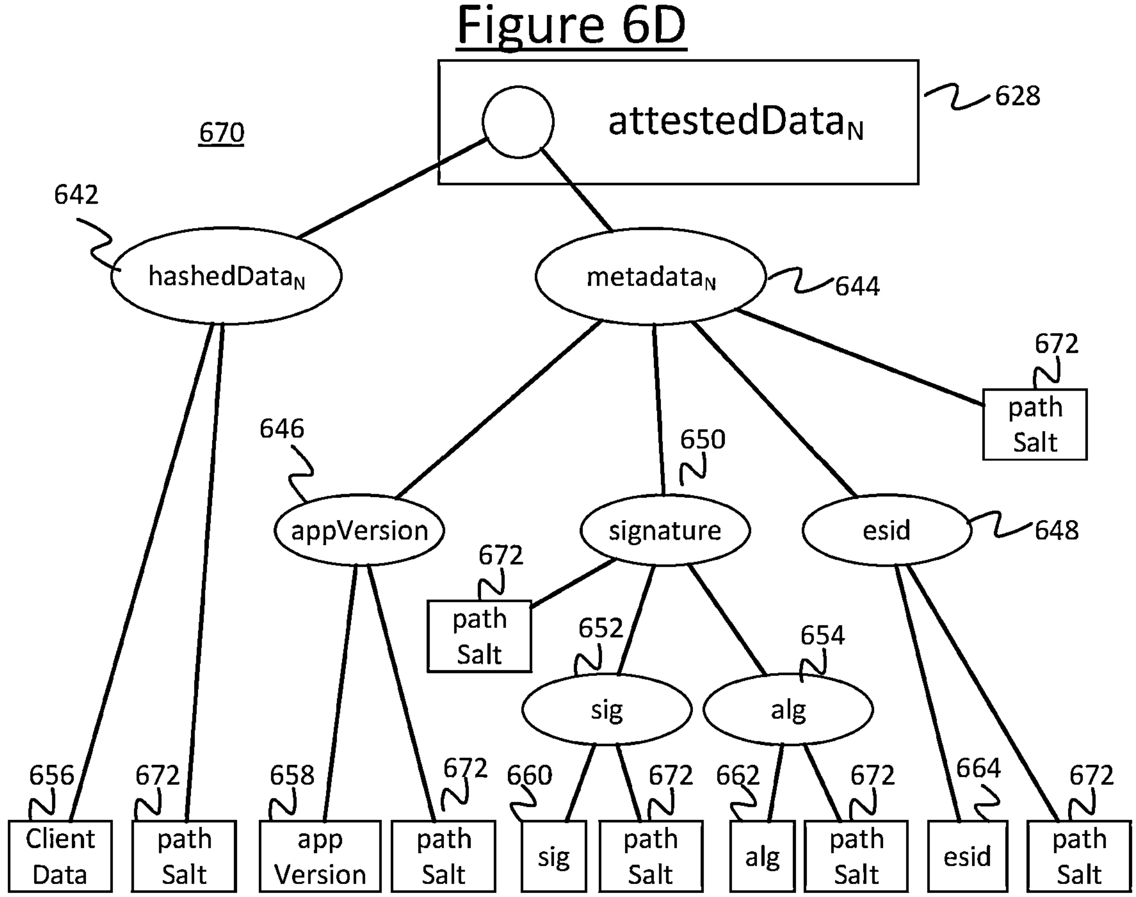

Referring to FIG. 6D, a fourth example hierarchical data structure 670 is shown. The fourth example hierarchical data structure comprises a number of the same components including the same nodes 642, 644, 646, 648, 650, 652, 654 and input values 656, 658, 660, 662, 664 as the third hierarchical data structure 640. Similar to the third hierarchical data structure, this fourth example hierarchical data structure has a corresponding input data as set out in Code Block 1. Different to the third hierarchical data structure, the digest associated with each node of the fourth example hierarchical data structure are further based on a pathSalt 672.

The pathSalt 672 is based on the path of the node and a salt. Preferably, the salt is the same for each node for the current attestedData$_N$ tree and will be different as compared with other attestedData trees (N+1, N−1 for example). Thus, it can be seen that since every node has a different path, every node will have a different pathSalt, even though they all have the same salts. This advantageously allows for each node within the hierarchical data structure to be salted (and all the advantages associated with that such as resistance to rainbow table attacks) without disclosing the salt itself to any party during verification. Thus, the digest of a node is the hash of a canonicalized JSON string of an object that has this structure:

```
{
  pathSalt: "<string encoded path salt>",
  value: <value of node>,
}
```

Optionally, as discussed above, the digest of a node is also based on a version. Preferably, the pathSalt 672 is calculated by taking a hash of a canonicalized JSON string of an object that has this structure:

```
{
  path: "<path to node>",
  salt: "<string encoded salt>",
}
```

Figure 6E:
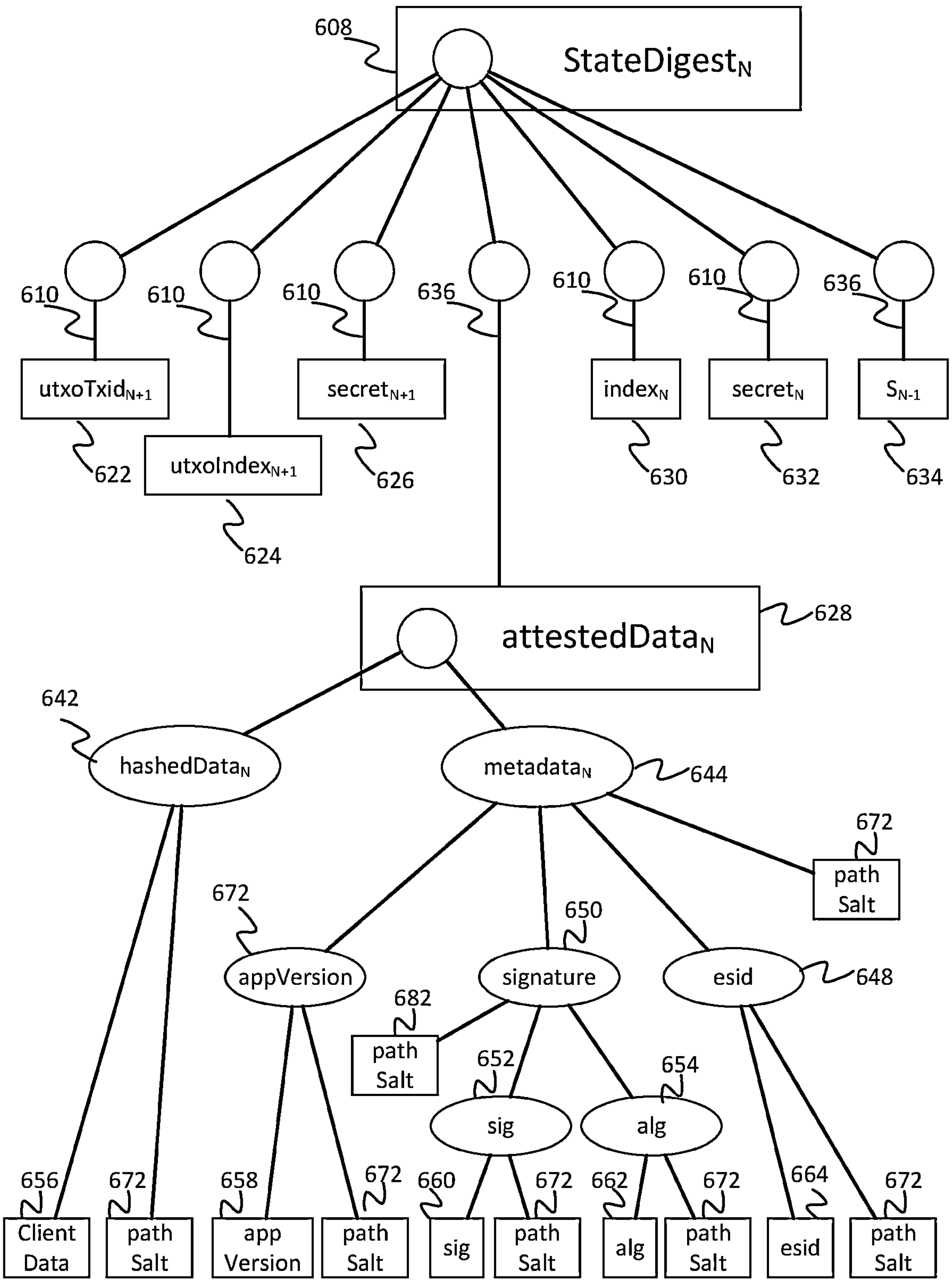

Referring to FIG. 6E, a fifth hierarchical data structure 680 is shown that comprises the second and fourth hierarchical data structures 620, 670. The second hierarchical data structure comprises the fourth hierarchical data structure by taking the root of the fourth hierarchical data structure 628 and using that as the attestedData$_N$ node 628 of the second hierarchical data structure. The same reference numerals have been used between the FIGS. 6B, 6D, and 6E to show the same or similar features are represented across each figure.

Figure 7:
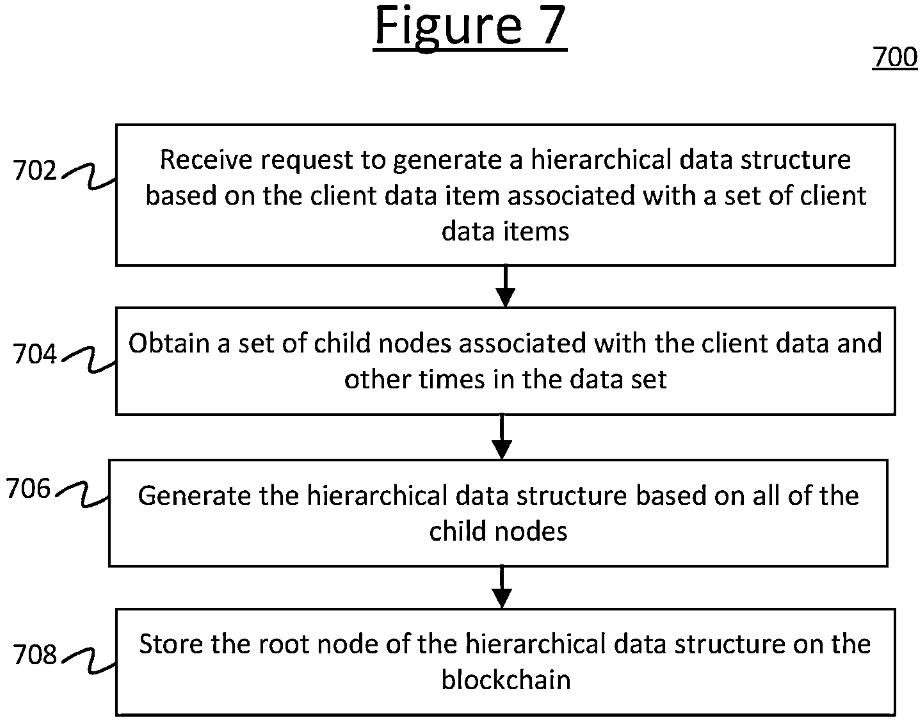
FIG. 7 illustrates a method for generating a hierarchical data structure.

Referring to FIG. 7, an example method 700 of constructing any of the data structures 600, 620, 640, 670, 680 as described with reference to FIGS. 6A to 6E. Preferably, the method is configured for constructing the hierarchical data structure associated with data received from a client. More preferably, the method is configured for constructing the hierarchical data structure for storing a value based on at least the received client data on a blockchain and even more preferably, the value based on the client data is the root of the hierarchical data structure. More preferably still, the client data belongs to a set of other data items previously received and optionally will be received in the future.

While a number of the steps of this method 700 are shown as sequential, as will be discussed below, this is merely for ease of explanation. As discussed below, a number of steps can be done in different orders and/or concurrently with each other.

In a first step 702, the client data is received. The client data is for use with generating a hierarchical data structure. As mentioned above, the client data preferably belongs to a set of data items and more preferably the set is an ordered set of data and even more preferably the set is a chain of data items and most preferably, the set of data is a chain of commitments associated with an Event Stream and the client data is an event.

In a next step 704, a set of child nodes for use in generating the hierarchical data structure are obtained. In the set of child nodes, there are nodes based on the following: the received client data, metadata associated with received client data, data representative of a previous data item in the set of data items, and data representative of a next data item in the set of data items.

Preferably the data representative of the previous and next data items in the set of data items are references to said data items.

The reference to the next data item is or comprises a reference to a next transaction associated with the next data item. As described with reference to FIGS. 6B and 6E, the reference to the next transaction comprises a transaction id of the UTXO funding the next transaction ($utxoTxid_{N+1}$) and an index of the UTXO funding the next transaction ($utxoIndex_{N+1}$). Additionally or alternatively, the reference to the next transaction comprises the next secret ($secret_{N+1}$).

As described with reference to FIGS. 6B and 6E, the reference to the previous data item is or comprises the state digest of the previous data item. Preferably, the state digest is the value that is stored on the blockchain in the transaction associated with the previous data item. This provides a way, on-chain, to confirm that the previous transaction is correct.

The metadata associated with the received client data preferably comprises metadata associated with the Event Stream. The metadata can be any one or more of the following:

- index—the index of the current event in the Event Stream (not necessarily the same as the index in the chain of commitments as it is not necessary that all events are recorded on the chain of commitments),
- secretN—a secret used,
- whenRecorded—the time when the event was received from the client and/or stored in the off-chain log,
- appVersion—a version number of the chain of commitments,
- seed—a seed value used at the start of the generation of the event stream,
- signature—a value relating to the signature of the client/submitter and optionally the algorithm used to generate the signature,
- delWriteIV—an initial value used in the generation of delegated authorisation tokens for writing to the event stream,
- delWriteHO—a final hash value used in the validation of delegated authorisation tokens for writing to the event stream,
- timeAC—a start and/or end time where the event stream is considered open for writing,
- delAuthIndex—an index of the delegated token a client used to submit the event, and/or.
- TxIDcreate—the transaction ID of the first transaction in the chain of commitments.

A person skilled in the art will appreciate that other metadata elements may also be used.

Preferably, there are child nodes based on each of the index and the $secret_N$ and more preferably, any number of the other metadata items listed above are used in the $metadata_N$ node as described with reference to FIGS. 6C to 6E.

The child node based on the client data is preferably a Merkle tree root according to the third hierarchical data structure 640 of FIG. 6C and more preferably a Merkle tree root according to the fourth hierarchical data structure 670 of FIG. 6D. Said hierarchical data structures are based on the received client data. The received client data is used to create input hierarchical data structure with the format as described with reference to Code Block 1. The same or similar steps are then taken to obtain the Merklized hierarchical data structures from the input hierarchical data. Thus, to obtain the child node based on the client data (and optionally based on other metadata too), a number of Merklize and/or HierarchicalMerklize steps are needed.

In a step 706, the hierarchical data structure is generated. Preferably, the hierarchical data structure is a Merkle tree and thus, is made of up a number nodes all having an associated (or comprising a) digest based on their children and/or input data. More preferably, the hierarchical data structure is of the form of any one or more of the hierarchical data structures as described with reference to FIGS. 6A-6E. Depending on what data is to be included, different tree structures may be used. Preferably the data the leaf nodes of the Merkle tree are based on are hashed to generate said leaf nodes. For example, the $utxoIndex_{N+1}$ 622 (which is an integer) is hashed 610 and the result of that is stored on the associated $utxoIndex_{N+1}$ node.

With the hierarchical data structure generated, a root node is obtained. The root node is stored 708 for later recall and preferably stored on the blockchain.

The above-described method 700 is conducted a number of times as new client data items are received.

The generation of the hierarchical data structure (for the purpose of obtaining the root node of the hierarchical data structure in particular) is a synchronisation point. This step is considered a synchronisation point because the generation the root node digest can only be conducted by a single thread taking all of the child nodes of the root node as inputs to the root node digest.

Of note, some of: the metadata associated with received client data, data representative of a previous data item in the set of data items, and data representative of a next data item in the set of data items can be obtained before reception of the client data. Further, as the data the nodes are based on can be obtained in advance, the data can also be processed in advance. Here, the processing for $secret_N$, $index_N$, $secret_{N+1}$, $utxoTxid_{N+1}$, $utxoIndex_{N+1}$, includes hashing of these items.

Further, as all of the child nodes have been selected such that they are independent of each other (that is to say, no child node input depends on any other child node or that node's input), all of the child nodes can be generated concurrently.

Thus, it can be seen that by selecting which data is provided as an input to the child nodes, the child nodes can be processed in advance and concurrently with each other. Thus, the overall processing speed generating hierarchical data structure (and thus obtaining the root thereof) can be greatly increased.

In particular reference to the systems described with reference to FIGS. 11 and 12, with the identified improvements of the present aspect, the processing of hundreds or thousands of client data requests can be conducted per second per server. Whereas without such features, it could be in the tens per second per server. Further still, the selection and/or identification of what data can be calculated concurrently/independently also enables said systems in FIGS. 11 and 12 (and any other system using the present aspect) to scale horizontally more effectively.

Proof of Existence Using Ordered, Append-Only Data Storage

Figure 8A:
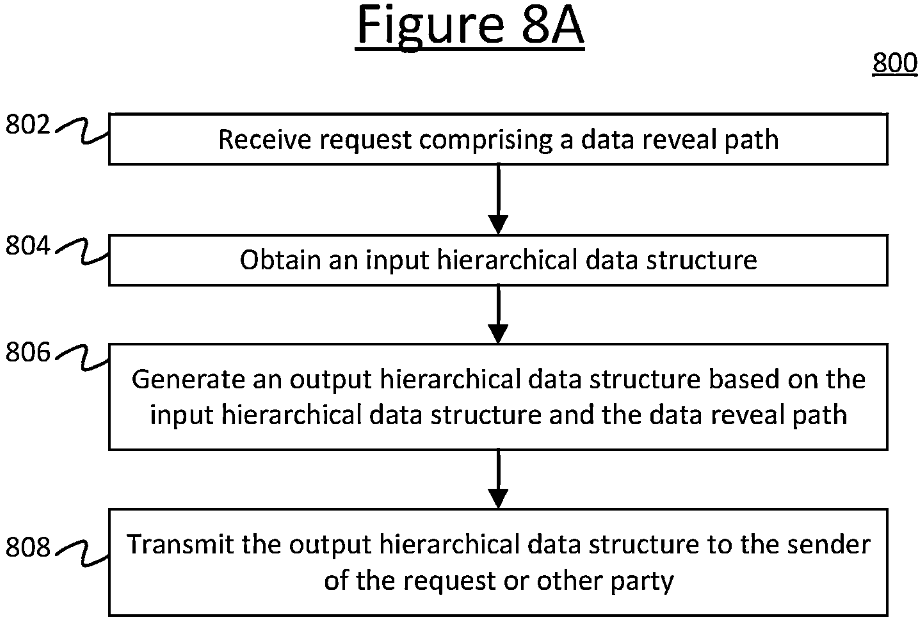
FIG. 8A illustrates a further method for generating a further hierarchical data structure.

Referring to FIG. 8A, an example method 800 for generating a proof of existence hierarchical data structure 800 is shown.

In a first step 802, a request is received comprising a data reveal path. The data reveal path is a path that refers to a node within an input hierarchical data structure. Preferably, the request or the path comprises a reference to a specific input hierarchical data structure. Preferably the reference to the input hierarchical data structure is or comprises a unique identifier. Here, the term "input" in input hierarchical data structure is used to refer to the fact that it is used as an input to the generation step when generating an output hierarchical data structure.

Next, the input hierarchical data structure is obtained 804. The input hierarchical data structure is preferably obtained from an off-chain database and preferably the off-chain data base 504 as set out in the system 500 of FIG. 5. More preferably, the off-chain database is as set out in the Data Archive of the Data Services 1602 and accessed via the Data Reader 1602*b* as described with reference to FIG. 12. The input hierarchical data structure preferably is of the form as the third, fourth, or fifth hierarchical data structures 640, 670, 680 as disclosed in FIGS. 6C-6E and have an associated implementing data format as described with reference to Code Block 1.

An output hierarchical data structure is generated or obtained 806 based on the input hierarchical data structure and the data reveal path. The output hierarchical data structure preferably has the same or similar structure in that it comprises the same or similar nodes. Preferably each node of the output hierarchical data structure has a corresponding node in the input hierarchical data structure. Preferably, the input hierarchical data structure has been previously Merklized and the root node of said input hierarchical data structure was stored for later recall. An example method 1020 of generating the output hierarchical data structure is described in more detail in relation to FIG. 10B.

Optionally, the request comprises a plurality of paths each referring to a node of interest, thus the request comprises a plurality of nodes of interest. Here, an output hierarchical data structure is generated instead revealing multiple nodes.

The node corresponding to the data reveal path in output hierarchical data structure, and all ancestor nodes thereof comprise a value associated with its corresponding node in the input hierarchical data structure. As used herein, "reveal" refers to the underlying data associated with a node (such as the actual signature as described in the examples used throughout) being provided to the receiver of the output hierarchical data structure. Preferably, the value of the corresponding nodes at the data reveal path are the same between the input and out hierarchical data structures. All of the other nodes in the output hierarchical data structure comprise a digest and not a value. A digest is used so that the value of the node can be used for verification purposes later while still obliviating and/or redacting the value itself. The digest is the result of a one-way function such that, any party with access to the output hierarchical data structure cannot reverse the digest and obtain the underlying value, or at least it would be prohibitively expensive to do so.

Figure 8B:
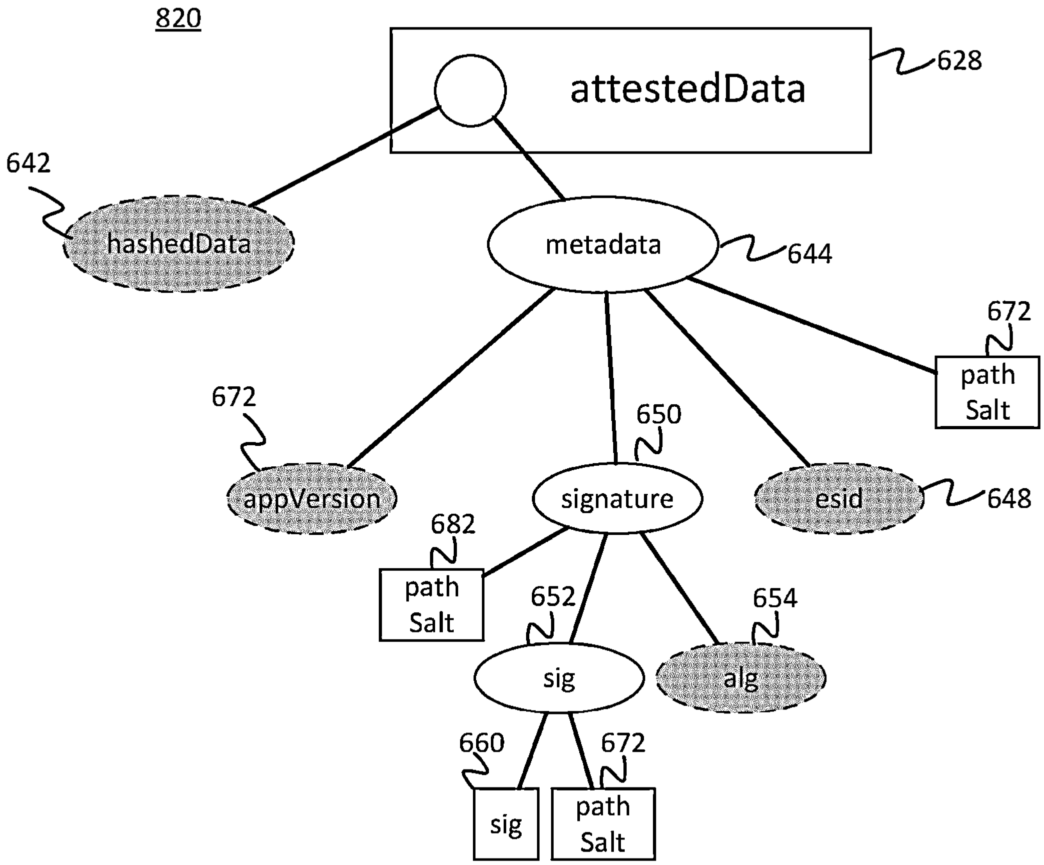
FIG. 8B illustrates an example further hierarchical data structure as generated according to method 8A.

Referring to FIG. 8B, an example output hierarchical data structure 820 is shown. The example output hierarchical data corresponds to an input hierarchical data structure according to the example shown in the third, fourth, or fifth hierarchical data structure as described in FIGS. 6C-6E. The same or similar reference numerals are used for the same similar node values and/or digests. In this example output hierarchical data structure, the data reveal path refers to the "sig" node. Optionally, the data reveal path is of the form "metadata.siganture.sig".

The example output hierarchical data structure 820 comprises a number of nodes 642, 672, 654, 648 which only comprise their corresponding digest. The "sig" node 650 comprises its corresponding value 660. The ancestor nodes of the node of interest all comprise their respective pathSalts 682. Of note, all of the information required to recreate the root node 628 is comprised in the output hierarchical data structure. Recreation of the root node 628 is part of the verification process and is discussed in greater detail with respect to FIG. 9.

A corresponding JSON object used to represent the example output hierarchical data structure 820 is shown below in Code Block 2.

Code Block 2

```
outputDataRevealTree = {
  "hashedData": { "digest": "qKmdAXmm7yl5 ... rh+lLhvxNc=" },
  "metadata": {
    "value": {
      "appVersion": { "digest": "26snJY ... ayKM=" },
      "signature": {
        "value": {
          "alg": { "digest": "Y887L ... XaxLvg=" },
          "sig": {
            "value": "cac18b730f ... 7d8093",
            "pathSalt": "VrTHytB ... V8I5D7U="
          }
        },
        "pathSalt": "sZL5UTdmMe ... 7BSXWF7z8="
      },
      "esid": { "digest": "q5jL ... 74Ro=" },
    },
  "pathSalt":
  "wm0eEGCQwWhDYs0gqe3ydiIi49+0xTH6MmwswekqXq4="
  },
}
```

It can be seen that the outputDataRevealTree is a representation of a Merkle tree proof represented using a JSON Object. The JSON Object can be transmitted as a string. Of note, each node can be represented according to its associated "value" and "pathSalt" or associated "digest". Here the value can comprise the revealed data, or the value can be based on the child nodes. For example the "signature" value is based on the "alg" and "sig" nodes and the "sig" node comprises the "cac18b730f. 7d8093" revealed data. As mentioned above, the value of "signature" is a Merkle root hash of the "alg" and "sig" nodes and preferably is a Merkle root hash of a string encoded Merkle root hash of the "alg" and "sig" nodes. And in an alternative and/or additionally, the value is JSON representation about that comprises its child nodes.

The output hierarchical data structure is preferably used to verify that the value located at the data reveal path was the part of the input hierarchical data structure when that was created. The verification thereof is conducted by comparison of the root node of the input hierarchical data structure (which preferably was stored somewhere when it was created, and more preferably stored on the blockchain and/or storing data based on the root node on the blockchain) with the root node of the output hierarchical data structure. Verification is discussed in greater detail below with reference to FIG. 9.

Returning to the method of FIG. 8A, preferably the output hierarchical data structure is transmitted 808 to the sender of the request. Optionally, the output hierarchical data structure is provided to a party that is interested in verifying the existence of the value located at the data reveal path. Even more preferably, the JSON string representing the output data structure is transmitted.

Optionally, a further proof is also provided to show that the outputDataRevealTree root node is comprised in the Merkle tree used in generating the stateDigestN. Alternatively, the outputDataRevealTree also comprises the layers above attestedData$_N$ 628 such that digests of the nodes one layer higher are also comprised in outputDataRevealTree (for example the child nodes 638 of the second hierarchical data structure 620 as described with reference to FIG. 6B). With such an arrangement, stateDigestN can be proved similarly as described in the verification method 900 with reference to FIG. 9.

Figure 9:
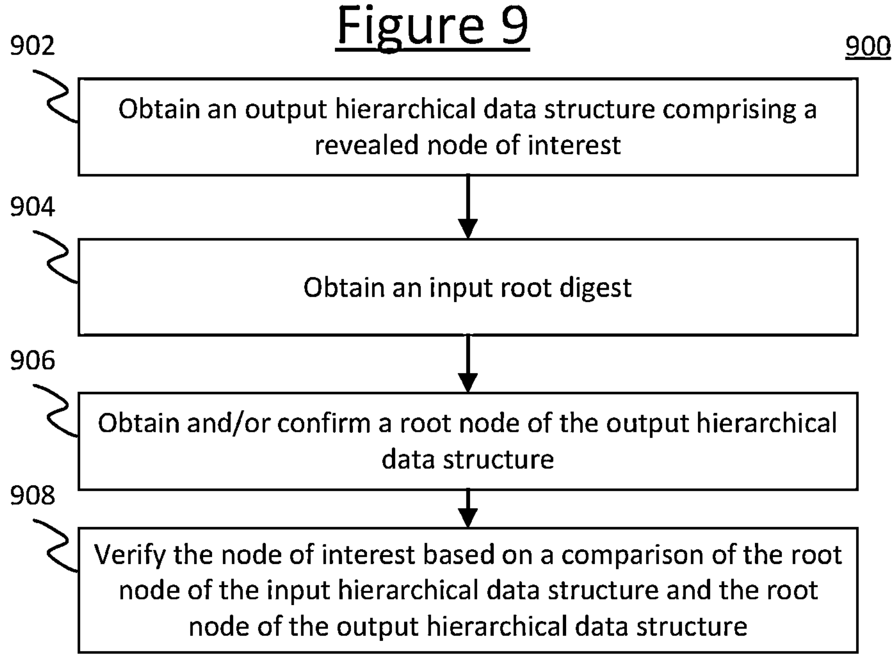
FIG. 9 illustrates an example method of validating the proof of existence of a value.

Referring to FIG. 9, an example method 900 of proving existence of a value is shown. The terms "input" and "output" are used in relation to the present method to be in keeping with the preceding embodiments.

In a first step 902, an output hierarchical data structure is obtained. Preferably, the output hierarchical data structure is in accordance with the data structure 820 described with reference to FIG. 8B. The output hierarchical data structure is obtained from a device which created and/or comprises the input hierarchical data structure.

Next, an input root digest is obtained 904. The input root digest is the digest root of the of an input hierarchical data structure used to create the output hierarchical data structure. More preferably, the input hierarchical data structure is in accordance with any one or more of the first through fifth hierarchical data structures 600, 620, 640, 670, 680 as described with reference to FIGS. 6A to 6E.

Notably, only the output hierarchical data structure and the root input hierarchical data structure are required to verify that the value of interest was (or was not) the same value as when the input hierarchical data structure was created (i.e. verify whether the value has been tampered with or modified any other way).

Preferably, the input root digest is obtained from an immutable and/or append-only source, for example from a blockchain. By using an immutable source for the input root digest, we can be assured that the value published there has always been said value.

To obtain the output hierarchical data structure, preferably a request is sent to a device, the request comprising a path to a node of interest. Preferably the request is sent to a device conducting the method 800 as described with reference to FIG. 8A. The device replies with the output hierarchical data structure with the node of interest referenced by the path revealed.

With the input root digest and the output hierarchical data structure, the root of the output hierarchical data structure is obtained or confirmed 906. Preferably, the root node of the output hierarchical data structure is obtained or confirmed according to the method 1020 as described with reference to FIG. 10C.

The verification is conducted 908 based on a comparison with the root node of the input hierarchical data structure and the root node of the output hierarchical data structure. Preferably, for the verification to be considered a success, the two root nodes should have the same associated digest.

Optionally, where the input root node is obtained from the blockchain, the transaction comprising said input root node is also confirmed to exist on the blockchain. Preferably, the device providing the output hierarchical data structure also provides a Merkle proof that the transaction has been included in a particular block. The verifier need only download the block's headers and/or retrieve them from its own storage and use the Merkle tree proof to ensure the transaction was indeed recorded on the blockchain. This transaction verification methodology can use and/or is a system similar to Simplified Payment Verification SPV (https://wiki.bitcoinsv.io/index.php/Simplified_Payment_Verification). In SPV, a client with access to the headers can verify that a particular transaction (in our case, the transaction that comprises the input hierarchical node) was recorded on the blockchain without downloading anything more than the headers of said blockchain. Alternatively, the verifier can search for the input root node using their own blockchain data store. The device providing the output hierarchical data structure may also provide metadata about the transaction and the block it belongs to (such as transaction id and block height) to allow for easier searching.

Referring to FIGS. 10A, 10B, 10C, and 10D there is shown methods 1000, 1020, 1040, 1060 which can be used to conduct the following:

(1000, 1020) a MerklizeHierarchical function to construct any one or more of the first to fifth hierarchical data structures 600, 620, 640, 670 as described with reference to FIGS. 6A to 6E, (1040) a PartialMerklizeHierarchical function for creating the output hierarchical data structure as described with reference to FIG. 8B, and/or (1060) a MerklizeHierarchical function using the output hierarchical data structure as described with reference to FIG. 8B for the purposes of verifying 900 the root node as described with reference to FIG. 9.

Of note, the PartialMerklizeHierarchical function is similar to the MerklizeHierarchical except any values that are not of interest are removed and/or not generated. While all of the above-mentioned methods 1000, 1020, 1040, 1060 are for different, interrelated purposes, it should be noted that all of them are for constructing at least a part of a hierarchical data structure as described herein for the purposes of obtaining/producing a root node (or enabling another part to obtain/produce a root node). In the first method 1000, the root node is stored in an immutable and/or trusted storage, in the second method 1020, the hierarchical data structure comprising the root node is for selective disclosure of value(s), and in the third method 1040, the root node generated/obtained is for comparison with the root node of (A) for verification purposes.

These methods 1000, 1020, 1040, 1060 are provided by way of example only. While the method steps are presented in a specific order, a skilled person will appreciate that strict coordination with the order is not required and that some steps may be conducted in different orders and/or concurrently.

Figure 10A:
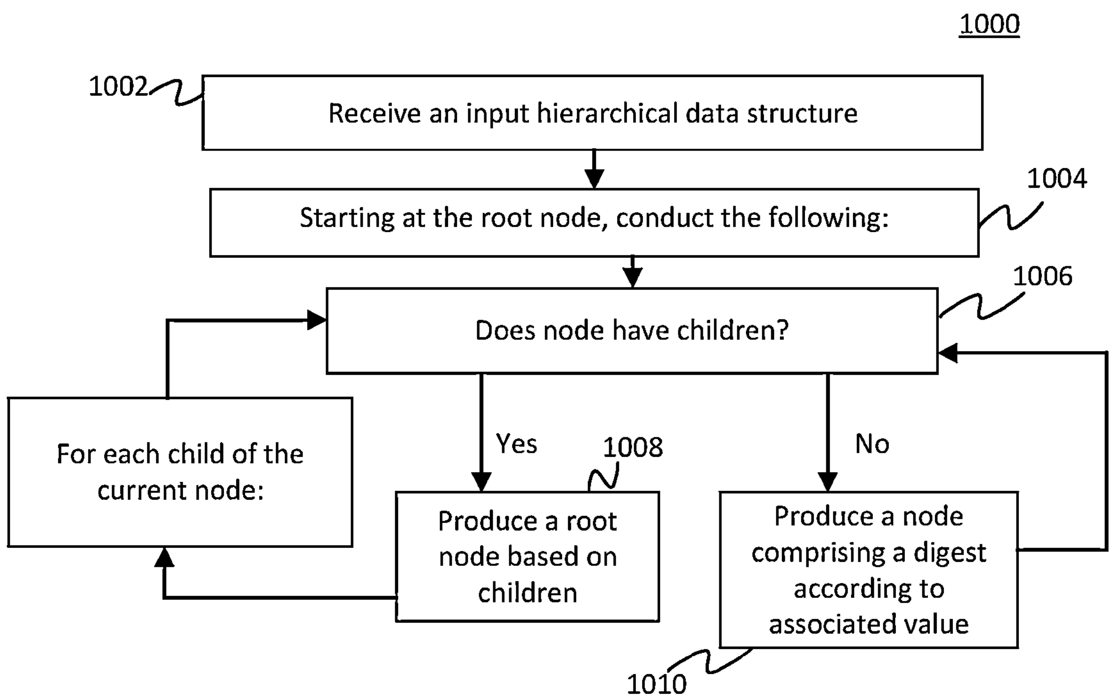
FIGS. 10A-10D illustrate example methods for generating a number of different hierarchical data structures.

Referring to FIG. 10A, a first method 1000 is shown. Here, the MerklizeHierarchical function receives the input hierarchical data structure 1002.

Next, starting at the root node, conducting 1004 the following steps:

Determine 1006 whether the node has any children. If the node does not have any children, produce a digest based on the node's associated data. Preferably, the digest is a hash of the following canonicalized JSON structure

```
{
  pathSalt: "<string encoded path salt>",
  value: <associated data of node>,
  version: <chain of commitments version>
}
```

If the node does have children, produce a digest based on the node's children. Preferably, the digest is a hash of the following canonicalized JSON structure where the value is a string-encoded Merkle root hash of all its children's digests. Thus, all of the digests associated with the children of the current node need to be determined and the method continues 1004 recursively taking each child node as an input.

```
{
  pathSalt: "<string encoded path salt>",
  value: <Merkle root hash based on child node's digests>,
  version: <chain of commitments version>
}
```

Figure 10B:
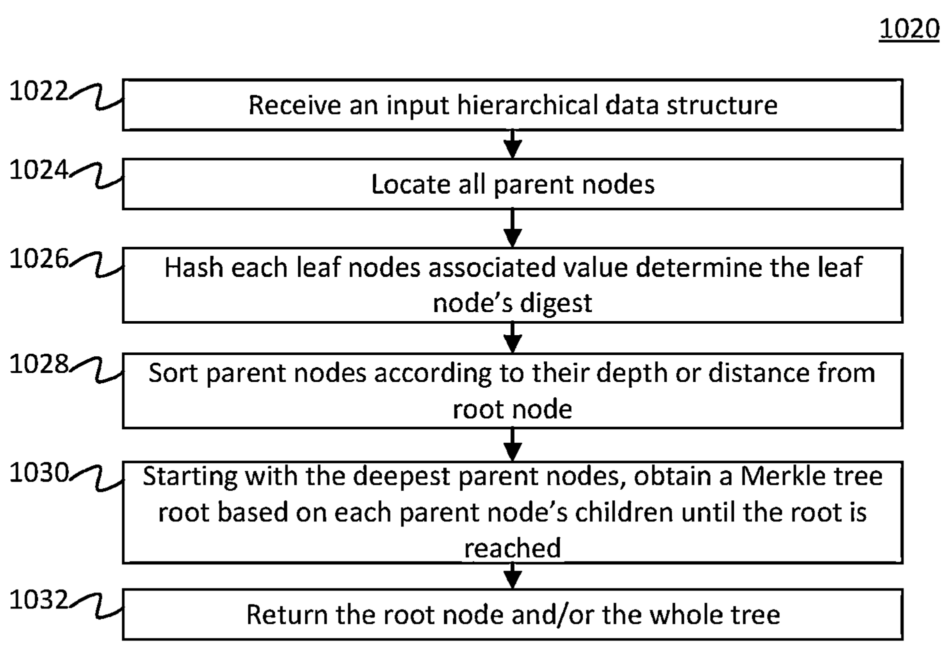

Referring to FIG. 10B, a second method 1020 is presented as an alternative to the first method 1000 is shown. Here, the MerklizeHierarchical function receives the input hierarchical data structure 1022. Then all of the nodes that comprise child nodes are located 1024. These nodes are parent nodes.

The leaf nodes (i.e. nodes without children) are all hashed 1026 using their value as the input.

Then, the parent nodes are ordered 1028 according to their depth (where depth is the distance from the root node).

Starting 1030 with the deepest parent node (which contains only leaf nodes as children), the previously mentioned regular Merklize function is used to create a Merkle tree root and thus each parent node will have an associated digest representing said node. This digest is then be used as a part of any further Merklize functions of other parent nodes.

Return 1032 the root node and/or the whole constructed Merkle tree to the caller.

Thus, using inputToAttestedData of mentioned in Code Block 1 as an input to the above example MerklizeHierarchical function would involve:

(A) Identifying all of the parent nodes of the input object—these are: the root, "metadata", and "signature", (B) Identifying the remaining nodes of the input object as leaf nodes—these are: "esid", "appVersion", "sig", "alg", "hashedData")

(C) Hashing the leaf nodes to obtain their digests. Thus,

```
esidDigest = H( "eyJ... ifQ" ),
appVersionDigest = H( "v1.0.4.30" ),
sigDigest = H( "cac... 093" ),
algDigest = H( "ECDSA" ), and
hashedDataDigest = H( "w6u... PI=" ).
```

(D) Ordering the parent nodes according to their depth, from deepest to most shallow—these are: "signature", "metadata", and the root.

(E) For each parent node in the ordered parent node list, Merklize their children and calculate a digest-thus, for the present example: for "signature":

```
signatureDigest = Merklize( { sigDigest, algDigest } )
    and for "metadata":
metadataDigest = Merlikze( { appVersionDigest,
    signatureDigest, esidDigest } )
  and finally for the root:
rootDigest = Merklize( { hashedDataDigest, metadataDigest } )
```

(F) return the rootDigest-Used as the attestedDataN as set out in FIG. 6C in the present example.

Note that the deeper Merkle tree roots need to be calculated first (such as the signatureDigest) such that their digests can be used in their parent Merkle tree node (as can be seen with metadataDigest requiring the deeper signatureDigest to be calculated first because metadataDigest is based on signatureDigest).

The above example method steps (A) through (F) are provided as a simplified example only. A skilled person will appreciate that other embodiments may also be used in there. For example, the hashes in steps (C) and (E) are also preferably based on their associated pathSalt. As another example, the input data structures to the hashes in steps (C) and (E) are also preferably canonicalized JSON structures (instead of strings or digests) as described with reference to the methods 1000, 1040, 1060 of FIGS. 10A, 10C, and 10D.

A skilled person will also appreciate that the same algorithm may be used with different input data layouts with different nesting and values—the above is presented merely to exemplify the method of Merklizing the input hierarchical data.

A skilled person will also appreciate that the above discussed method 1000 is an example only. Other methods of conducting the MerklizeHierarchical function may also be used. These other methods could include (a) recursive function calling of MerklizeHierarchical where the MerklizeHierarchical is called on each node encountered while walking the tree until the leaf nodes are reached, or (b) starting by iterating over each node in the leaf node layer and hashing them, and for each leaf node that comprises a parent, run MerklizeHierarchical on said parent node, then continuing the same process for each layer above the leaf nodes until the root node is reached.

Figure 10C:
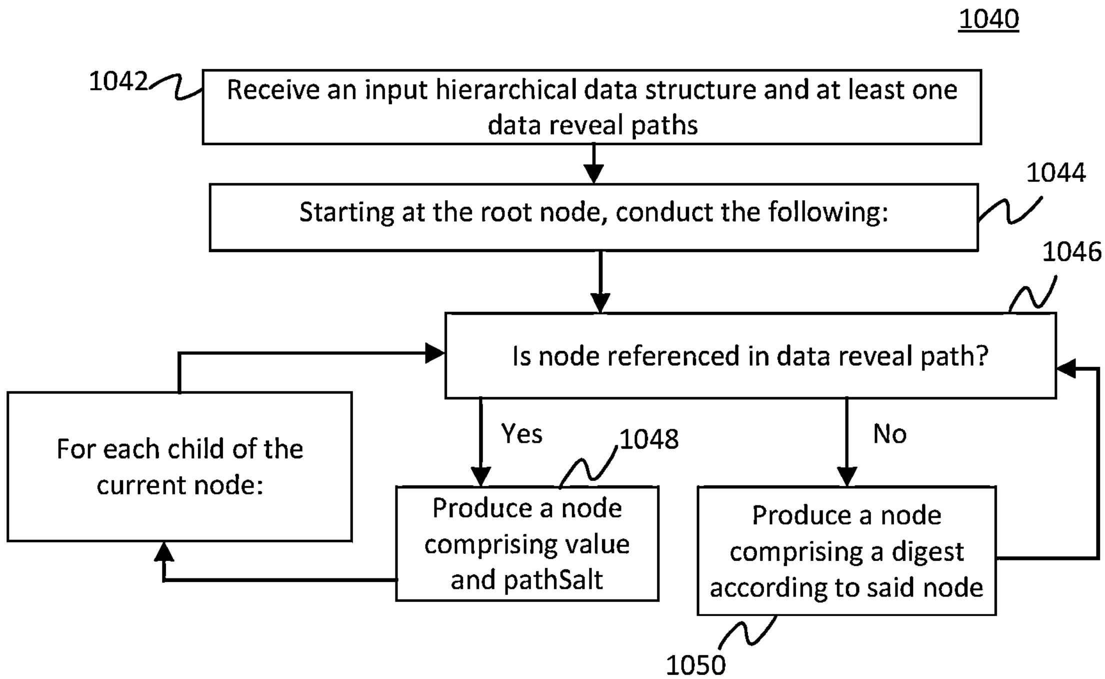

Turning to FIG. 10C, an example method 1040 of generating an output hierarchical data structure revealing one or more nodes referenced by data reveal paths is shown. Preferably, the output hierarchical data structure generated by the present example method is in accordance with the structure 820 shown in FIG. 8B.

First, an input hierarchical data structure and at least one data reveal paths are received 1042.

Next, starting 1044 at the root node of the hierarchical data structure:

Determine 1046 whether the node is referenced in one of the paths and/or is an ancestor of one of said nodes.

If the node is referenced in one of the paths and/or is not an ancestor thereof:

Produce 1048 a node in the output hierarchical data structure preserving the value and pathSalt (preferably in the form immediately below) and for each child node of the current node, continuing at the determine step 1046.

```
{
  pathSalt: "<string encoded path salt>",
  value: <value of node>,
}
```

If the node is not referenced in one of the paths and/or is not an ancestor thereof:

Produce 1050 a node in the output hierarchical data structure preserving only the digest representing said node (preferably in the form immediately below) and for each sibling node, continue at the determine step 1046

```
{
  digest: "<digest string>",
}
```

This method will terminate once all of the nodes of interest have been "revealed" and thus the output hierarchical data structure is ready for transmission.

To help illustrate the above discussed method the first few steps are set out below using the example of Code Block 1 as an input to the present method 1040 and again using "metadata.signature.sig" as a path of interest.

The root node of any input hierarchical data structure is an ancestor of a node of interest, thus after the first iteration, the output hierarchical data structure looks the same as it started. Next, we take the children of the root node: "hashedData", and "metadata". "hashedData" is not an ancestor of the node of interest and is thus replaced with its digest (based on its value and its pathSalt). "metadata" is an ancestor of the node of interests and is thus an output comprising the value and the pathSalt is obtained. The value being based on the digests of all of its children and preferably a Merkle tree root based on the digests of its children. The method continues for each child node of "metadata" and until all of the nodes are exhausted.

Again, this method is exemplary and other steps may be taken instead to achieve the same output hierarchical data structure. Other method could include obtaining all of the nodes and iterating over each node instead of walking the tree as discussed in the example method 1040.

Figure 10D:
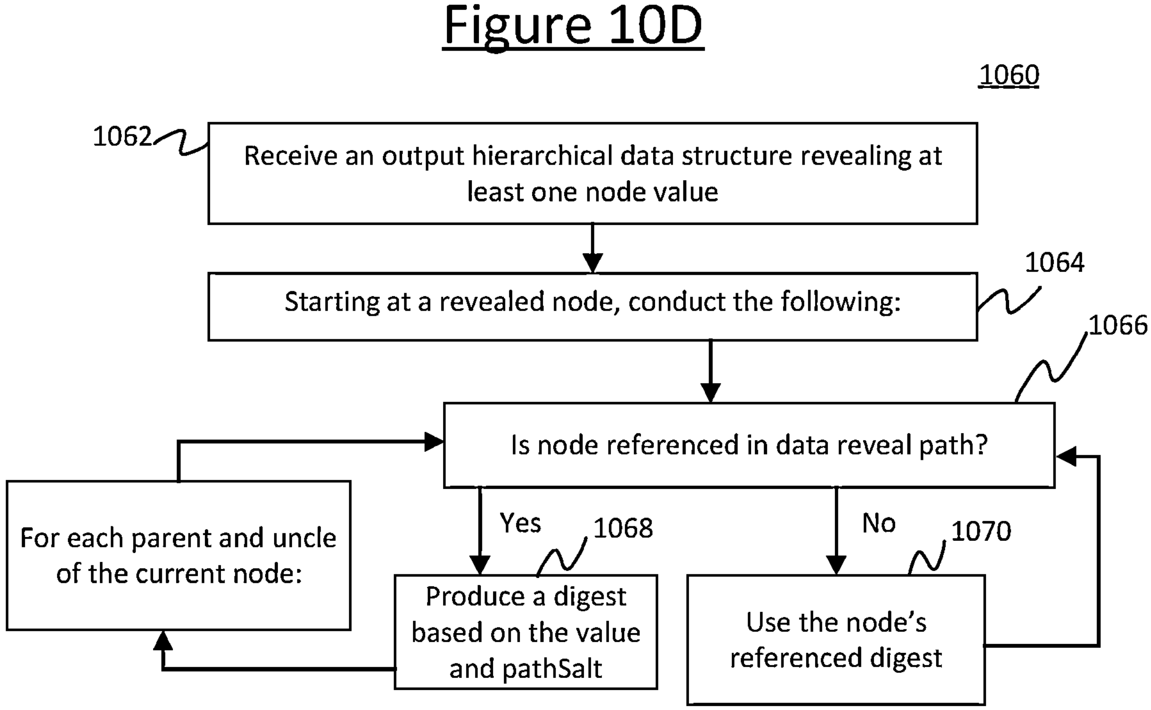

Referring to FIG. 10D, an example method 1060 of taking an output hierarchical data structure and confirming the digest of its root node is shown. Of note, the method 1060 is similar to that of the creation of the output hierarchical data structure method 1040.

A first difference in the present method 1060 are that the first step 1062 is to receive the output hierarchical data structure that comprises at least one revealed node value.

Another difference in the present method 1060 is that the method is configured to start 1064 from the revealed node(s) and move up the tree towards the root, calculating digests 1068 and/or using the precalculated digests along the way 1070 based on the determination 1066 of whether the node is in a data reveal path, or is a ancestor thereof.

With all of the digests of the tree determined, the digest of the root node is obtained. This is preferably used for verification as discussed with reference to FIG. 9.

Illustrative Example

As a further illustrative example to show how different data layouts can also work with the present methods and systems. The following input hierarchical data of Code Block 3 is used to exemplify this as it comprises further layers of nodes. In the current example the input hierarchical data structure comprises the "rendezvous Instructions" node, the contents of which the operator of the present system does not wish to disclose.

Code Block 3

```
{
  "hashedData":
  "w6uP8Tcg6K2QR905Rms8iXTlksL6OD1KOWBxTK7wxPI=",
  "metadata": {
    "appVersion": "v1.0.4.30",
    "esid": "eyJsIjoiZnJhbm ... cyI6IkVTIiwidiI6IjEifQ",
    "rendezvousInstruction": {
      "ref": "qux",
      "delegate": 0,
      "tags": ["foo","bar","baz"],
      "appendIf": null,
      "validFrom": null,
      "validUntil": "2022-02-17T11:58:21Z"
    },
    "signature": {
      "alg": "ECDSA",
      "sig": "cac18b730f6f68b ... c36287d8093"
    },
  "whenReceived": "2022-02-13T13:23:52Z"
}
```

With this input hierarchical data, the root node thereof is determined (preferably using the method 1000 described with reference to FIG. 10A), and a corresponding hierarchical data structure is created according to FIG. 6E such that a final stateDigestN digest is determined and stored on a blockchain transaction. The blockchain transaction is transmitted for inclusion on the blockchain.

Later, a third party wishes to verify that a certain user signed the data for a given event in an event stream. The signature data is stored at the path "metadata.signature.sig". The third party transmits said path and an identifier identifying the particular event.

A device receives the request, obtains the relevant input hierarchical data structure, constructs an output hierarchical data structure based on the input hierarchical data structure and the received path (preferably using the method 1040 described with reference to FIG. 10C). The output hierarchical data structure has a JSON representation according to Code Block 4 below. The output hierarchical data structure as well as a further Merkle proof configure to prove the stateDigest are transmitted to the third party. Optionally, the output hierarchical data structure also comprises the digests require to prove the $stateDigest_N$.

Code Block 4

```
{
  "hashedData": { "digest": "qKmdAXm ... 4phZrh+lLhvxNc=" },
  "metadata": {
    "value": {
      "appVersion": { "digest": "26snnt ... p6CKM=" },
      "esId": { "digest": "g5jL3efi ... J774Ro=" },
      "rendezvousInstruction": {"digest": "xOqz ... JFUs=" },
      "signature": {
        "value": {
          "alg": { "digest": "Y887L ... G0UXaxLvg=" },
          "sig": {
            "value": "cac18b730f ... ac36287d8093",
            "pathSalt": "VrTHytBM ... MibV8I5D7U="
          }
        },
        "pathSalt": "sZL5UT ... XW3syF7z8="
```

-continued

Code Block 4

```
        },
        "whenReceived": { "digest": "TFr4rtG ... xReemLCo=" }
    },
  "pathSalt":
  "wm0eEGCQwWhDYs0gqe3ydiIi49+0xTH6MmwswekqXq4="
    },
}
```

Using the output hierarchical data structure, the third party confirm the root node digest of the output hierarchical data structure (called attestedDataN herein). The further proof is used to obtain/confirm the stateDigestN value. This calculated stateDigestN value is compared with that obtained from the blockchain. If these two values are the same, then the value revealed at "metadata.signature.sig" is the same as when it was recorded on-chain initially.

Of note, the third party not only does not see any values other than the value of interest, it also does not see any other structure of the hierarchical data structure. Not even the names of the values under "rendezvousInstruction" are revealed.

Event Stream Platform System

According to a further aspect, any one or more of the preceding embodiments may be used with a platform processor as described below for providing the on-chain and off-chain data storage and/or verification of on-chain and off-chain data storage. This further aspect may be Platform as a Service (PaaS) and Software as a Service (SaaS) offering that advantageously enables rapid delivery of useful real world business and technical applications, such as management of software controlled technical systems or smart contracts, using a blockchain network such as the BSV blockchain.

An overview of the platform services can be seen in FIG. 11 that shows a high-level schematic of the system. The platform service has a platform processor 1500 that provides an API 1508, via which the services may be accessed by one or more clients.

Platform Services 1500 as shown in this Figure are made up of three families of services and is aimed at allowing users and organisations to easily and securely make use of the advantages offered by the unique properties of a blockchain, without actually implementing any blockchain based software, knowledge, or libraries at the client end. These services are:

- Data Services 1502 that aim to simplify the usage of the chain as a commodity data ledger. The Data Services preferably use the data structures and methods provided herein for implementing data writing to and reading from the blockchain.
- Compute Services 1504 that aim to provide a generalised compute framework backed by a digital asset such as Bitcoin SV.
- Commerce Services 1506 that provide enterprise-class capabilities for transacting using a digital asset such as Bitcoin SV.

Requests may be received via or using the HTTPS protocol from a client at the API, as the API is implemented as a web service. The requested services are then implemented by the one or more service modules or processing resources 1502-1506 using underlying software 1510, such underlying software 1510 being associated with the blockchain, i.e. to implement resources, libraries and/or key-management wallet implementations for creating, processing and submitting transactions associated with the blockchain. Once processed, transactions can be submitted to the blockchain network 1512 (instead of the client implementing any such functionality or transaction libraries). At most, the client may or can implement a digital wallet or the like associated with cryptocurrency or some other digital asset, but this is not essential as the platform service 1500 may also be able to provide and manage the digital asset for the client.

FIG. 12 provides a more granular schematic view of the plurality of services associated with a blockchain, and which can be implemented by the platform 1600 that is associated with an API via which any one or more of the offered services can be accessed. As seen in this FIG. 12, the data services 1602 may include a data writer 1602*a* and a data reader service 1602*b*. The event streams and/or data writer optionally implement the method 700 as described in FIG. 7. Similarly, the client and/or third party wishing to access the data they have written using the embodiments described herein may use the data reader 1602*b*. Further details of event streams are discussed with reference to FIGS. 4 to 8 of UK Patent Application No. 2002285.1 (filed in the name of nChain Holdings Limited on 19 Feb. 2020) and is hereby incorporated by reference. The data writer service 1602*a* enables clients to write data into the blockchain in a simple, secure and optimised manner. The data reader service 1602*b* enables the clients to send queries, which returns data that is stored in the blockchain. This may be using filtered streams in which the client may pre-define the type of data that they wish to read from the blockchain on an ad hoc or periodic basis, i.e. within a certain timeframe, or those associated with a set of related or unrelated events or documents that are processed in the blockchain 1610. The data archive feature allows access to logs of previous transaction for a specified event or contract.

The compute services 1606 of the platform 1600 includes an application 1606*a* and framework 1606*b* associated with smart contracts, which in some embodiments may be represented as a state machine in the blockchain 1610. The compute services 1606 interacts with the data services 1602 as data will need to be input and results provided to a client for any such computation.

Commerce services 1604 are responsible for provision of enterprise-class capabilities via enterprise wallets 1604*a* for transacting over the blockchain 1610, based on best-in-class security practices and technologies. For example, in some embodiments, enterprise wallets may implement functionality to enable blockchain transaction processing when more than one person or user or account may need to sign off on a transaction meeting a defined criterion. i.e. associated with cryptocurrency of a large value above a certain predefined limit. An enterprise wallet may also include functionality to implement a threshold number and/or type of signatures to move large amounts of digital assets such as cryptocurrency or tokens representing another resource. The movement of these assets can then be represented on the blockchain following processing based on the criteria applied by such enterprise wallet implementation.

The SPV services 1608 (simplified payment verification) are applications that require information from the blockchain but do not include direct links to it, as they do not run a miner node. Such SPV service 1608 allows a lightweight client to verify that a transaction is included in a blockchain, without downloading the entire blockchain 1610.

Devices

Turning now to FIG. 13, there is provided an illustrative, simplified block diagram of a computing device 2600 that may be used to practice at least one embodiment of the present disclosure. In various embodiments, the computing device 2600 may be used to implement any of the systems or methods illustrated and described above. For example, the computing device 2600 may be configured to be used as one or more components in the systems 1500, 1600 of FIG. 11 or 12, or the computing device 2600 may be configured to be a client entity that is associated with a given user; the client entity making database requests and/or submissions, the platform processor, and/or database manager. As a further example, the computing device 2600 may be configured to undertake the methods 700, 800, 900, 1000, 1020, 1040 of FIGS. 7, 8A, 9, 10A, 10B, and 10C. Further still, the computing device 2600 may be configured to generate, receive and/or otherwise process the on-chain and off-chain structures 504, 502, 600, 620, 640, 670, 680, 820 as described in FIGS. 5, 6A-6E, and 8B. Thus, computing device 2600 may be a portable computing device, a personal computer, or any electronic computing device. As shown in FIG. 13, the computing device 2600 may include one or more processors with one or more levels of cache memory and a memory controller (collectively labelled 2602) that can be configured to communicate with a storage subsystem 2606 that includes main memory 2608 and persistent storage 2610. The main memory 2608 can include dynamic random-access memory (DRAM) 2618 and read-only memory (ROM) 2620 as shown. The storage subsystem 2606 and the cache memory 2602 and may be used for storage of information, such as details associated with transactions and blocks as described in the present disclosure. The processor (s) 2602 may be utilized to provide the steps or functionality of any embodiment as described in the present disclosure.

The processor(s) 2602 can also communicate with one or more user interface input devices 2612, one or more user interface output devices 2614, and a network interface subsystem 2616.

A bus subsystem 2604 may provide a mechanism for enabling the various components and subsystems of computing device 2600 to communicate with each other as intended. Although the bus subsystem 2604 is shown schematically as a single bus, alternative embodiments of the bus subsystem may utilise multiple buses.

The network interface subsystem 2616 may provide an interface to other computing devices and networks. The network interface subsystem 2616 may serve as an interface for receiving data from, and transmitting data to, other systems from the computing device 2600. For example, the network interface subsystem 2616 may enable a data technician to connect the device to a network such that the data technician may be able to transmit data to the device and receive data from the device while in a remote location, such as a data centre.

The user interface input devices 2612 may include one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 2600.

The one or more user interface output devices 2614 may include a display subsystem, a printer, or non-visual displays such as audio output devices, etc. The display subsystem may be a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 2600. The one or more user interface output devices 2614 may be used, for example, to present user interfaces to facilitate user interaction with applications performing processes described and variations therein, when such interaction may be appropriate.

The storage subsystem 2606 may provide a computer-readable storage medium for storing the basic programming and data constructs that may provide the functionality of at least one embodiment of the present disclosure. The applications (programs, code modules, instructions), when executed by one or more processors, may provide the functionality of one or more embodiments of the present disclosure, and may be stored in the storage subsystem 2606. These application modules or instructions may be executed by the one or more processors 2602. The storage subsystem 2606 may additionally provide a repository for storing data used in accordance with the present disclosure. For example, the main memory 2608 and cache memory 2602 can provide volatile storage for program and data. The persistent storage 2610 can provide persistent (non-volatile) storage for program and data and may include flash memory, one or more solid state drives, one or more magnetic hard disk drives, one or more floppy disk drives with associated removable media, one or more optical drives (e.g. CD-ROM or DVD or Blue-Ray) drive with associated removable media, and other like storage media. Such program and data can include programs for carrying out the steps of one or more embodiments as described in the present disclosure as well as data associated with transactions and blocks as described in the present disclosure.

The computing device 2600 may be of various types, including a portable computer device, tablet computer, a workstation, or any other device described below. Additionally, the computing device 2600 may include another device that may be connected to the computing device 2600 through one or more ports (e.g., USB, a headphone jack, Lightning connector, etc.). The device that may be connected to the computing device 2600 may include a plurality of ports configured to accept fibre-optic connectors. Accordingly, this device may be configured to convert optical signals to electrical signals that may be transmitted through the port connecting the device to the computing device 2600 for processing. Due to the ever-changing nature of computers and networks, the description of the computing device 2600 depicted in FIG. 13 is intended only as a specific example for purposes of illustrating the preferred embodiment of the device. Many other configurations having more or fewer components than the system depicted in FIG. 13 are possible.

Example Illustrative Application—Livestock Tracking

An example application of the ordered, append-only data storage and verification as described herein with reference to FIGS. 5 to 13 is for use with livestock tracking. To adhere to international livestock market rules and regulations, secure tracking of all of ownership, use, and other management of livestock is needed. In particular, the presence of current animal pathologies and the perceived risk for new emerging pathologies highlights the importance of increased security of livestock management generally. Thus, it can be seen that the use of the ordered, immutable, blockchain based data storage and verification system described herein can advantageously assist anyone involved with the management, sale, purchase, use of livestock to verify that the information associated with any animal they are interacting with is correct and immutable.

Vaccination status and ownership tracking are of particular importance and the use tamper-proof and privacy-preserving record of sequential events (as set out herein) can achieve or assist in achieving secure vaccination status tracking. The sequence in which events happen needs to be maintained to prove the time flow order and dependencies or interference in the events occurrence.

Figure 14:
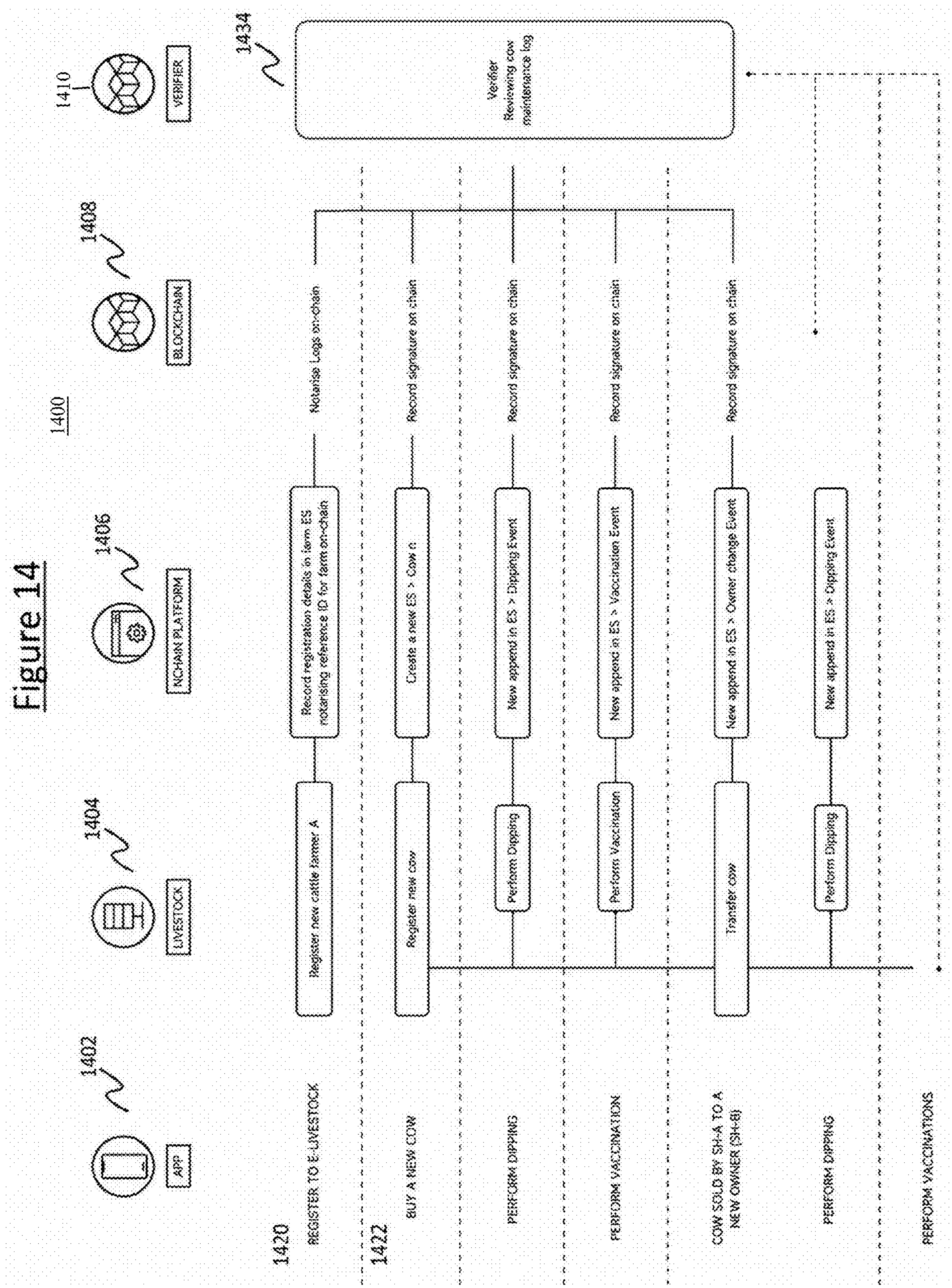
FIG. 14 is a schematic diagram, illustrating the components of a platform of a plurality of services relating to an embodiment.

Turning to a specific example of the system, FIG. 14 provides a schematic diagram 1400 of a number of possible data flows and process as conducted by different members in the system. As can be seen here, the process platform 1408 conducts several Event Stream (ES) blockchain writing based actions 1420, 1422, 1424, 1426, 1428, 1430. Event Streams are provided here as a specific example of an API processing layer of interaction with the blockchain. A person skilled in the art will appreciate that other APIs may be possible which similarly maintains an ordered, append only list of events and store them on the blockchain in accordance with the embodiments described herein. The process platform 1408 can also be described as a blockchain interface system or server. Also shown is a blockchain based verification process 1434 using the blockchain data in coordination any or all of the blockchain 1408, the processing platform 1406 and the livestock database 1404.

The proposed livestock tracking system 1400 comprises a number of hardware elements and software elements. Users of the system have a smartphone with livestock management software application 1402. The application is configured to communicate with a livestock database (or other server) 1404. The livestock database is configured to interact with the process platform 1406, which is referenced in the figure as the nChain platform. The process platform is configured to record attestation data to a blockchain 1408 in accordance with the chain of transactions as described herein.

Each animal has an associated identification tag. The identification tag uniquely identifies each animal among the livestock. The identification tag preferably has a unique identifier associated and/or stored on the tag.

The identification tag is preferably in the form of an RFID (Radio Frequency Identification) tag embedded within the animal. Alternatively, the identification tag is a physical cattle ear tag which has a QR code printed on it, the QR code encoding the unique identifier and the QR code.

Preferably, ultra-high frequency (UHF) RFID are used that have a read range of 1 m to 12 m. UHF-RFID tags are passive, meaning they do not require an additional power source. Passive tags are low-cost and therefore more accessible for farmers.

A livestock database 1404 is provided which comprises all the unique identifiers associated with each animal and preferably stores additional information associated with each animal. For example, the owner of a given animal with an associated unique identifier is stored in the livestock database. Each owner is also identified with a unique account ID. Other information associated with each animal unique identifier are gender, state, weight, and other descriptions. More preferably, links to the animal's parent's unique identifiers is possible in a hierarchical and/or relational manner (as in using a relation database management system via foreign keys or similar).

Also provided in the proposed livestock tracking system is a smart phone application 1402 (or other hardware device comprising the same or similar application code as the smart phone application) configured to interact with, or comprises an, identification tag reader (such as the RFID scanners discussed above) as well as being configured to interact with the livestock database system.

FIG. 14 shows a number of events 1420, 1422, 1424, 1426, 1428, 1430 which use the processing platform 1406 to store data for later verification 1432 on the blockchain 1410. Preferably the data stored on the blockchain is in the form of the Data Digest (Hp) and/or State Digest(S) as described herein. Said data stored on the blockchain functions as a "signature" on chain and/or a "notarisation". These terms are used to describe the Data Digest and/or State Digest's function of providing a proof of existence for a verifier to verify the data relating to the events associated with the animal.

A number of the events 1420, 1424, 1426, 1428, 1430, comprise, use, or are associated with an append event. The append event preferably involves the process of storing a transaction on the blockchain such that the transactions is associated with a chain of transactions as described herein. A creation event 1422 preferably involves creation of an event stream and/or creation of a chain of transactions as described herein.

Preferably, a user registering 1420 to the livestock database platform triggers data to be stored on the blockchain 1408. The livestock database generates 1404 creates an account for the user and an associated unique account ID. Notarisation data of the user's account creation is stored on the blockchain. This way, the account ID and any associated metadata with the account is stored in an immutable secure way. Optionally the account also has an event stream (and thus a chain of transactions) associated with it such that any events involving the user can also be tracked.

Upon registration of a new animal 1422, such as a cow, a new event stream is generated such that any further information relating to the animal can be securely associated on the blockchain for later verification.

Example events which might also be recorded on the blockchain include performing dipping 1424, 1430 and performing vaccination 1426 of the animal. Notarisation data representing these events are stored on the blockchain and associated with the same animal's event stream through use of an "append event" as set out in FIG. 14.

If ownership of the animal is transferred from one party to another 1428 (though a sale for example), another append event may be used to record attestation data of the new owner.

Optionally, where the owners have associated event streams, a rendezvous transaction is used to ensure that all of the event streams associated with the seller, the buyer, and the animal, are atomically synchronised on the blockchain and there is never any point in the transaction history, from the point of view of the data stored on the blockchain, where the animal has two owners, no owners, or any other incorrect intermediate state.

Where the animal does not need to be tracked by the livestock database 1404 anymore, a finalise event is provided to the processing platform 1406. With a finalise event, the event stream is finalised, the final transaction stored on the blockchain comprises a null NEXT reference such that and no further events can be appended.

Throughout an animal's lifetime, there exist many points where a proof of an event (such as vaccination) is needed. The chain of transactions provides a proof of existence for all events that have occurred in relation to said animal, including vaccination events. As described herein, storage of this proof of existence on the blockchain therefore provides an immutable and secure proof of existence.

Preferably, the verification process is as described under the heading "Proof of Existence Using Ordered, Append-only Data Storage". Preferably, the verifier 1410 undertakes the method described with reference to FIG. 9 such that they are able to verify livestock related data. Preferably, the processing platform 1406 and/or the livestock database 1404 are configured to undertake the methods described with reference to FIGS. 7 and 8A.

With the verification process described herein, a third party is able to verify various events associated with any livestock being tracked. Through use of the data reveal path(s), livestock owners have control over which data they are able to present to a verifier. For example, where a verifying party 1410 is interested in only vaccination information of an animal in particular, an owner of the animal can arrange for a data reveal path to reveal only the information relating to vaccination status. This way, any other information the animal owner wishes to keep hidden (such as the price, location, or any other private information) is still kept hidden, even if the other information is stored on the same event.

The various methods described above may be implemented by a computer program. The computer program may include computer code arranged to instruct a computer to perform the functions of one or more of the various methods described above. The computer program and/or the code for performing such methods may be provided to an apparatus, such as a computer, on one or more computer readable media or, more generally, a computer program product. The computer readable media may be transitory or non-transitory. The one or more computer readable media could be, for example, an electronic, magnetic, optical, electromagnetic, infrared, or semiconductor system, or a propagation medium for data transmission, for example for downloading the code over the Internet. Alternatively, the one or more computer readable media could take the form of one or more physical computer readable media such as semiconductor or solid-state memory, magnetic tape, a removable computer diskette, a random-access memory (RAM), a read-only memory (ROM), a rigid magnetic disc, and an optical disk, such as a CD-ROM, CD-R/W or DVD.

In an implementation, the modules, components and other features described herein can be implemented as discrete components or integrated in the functionality of hardware components such as ASICS, FPGAs, DSPs or similar devices.

A "hardware component" or "hardware module" is a tangible (e.g., non-transitory) physical component (e.g., a set of one or more processors) capable of performing certain operations and may be configured or arranged in a certain physical manner. A hardware component may include dedicated circuitry or logic that is permanently configured to perform certain operations. A hardware component may be or include a special-purpose processor, such as a field programmable gate array (FPGA) or an ASIC. A hardware component may also include programmable logic or circuitry that is temporarily configured by software to perform certain operations.

Accordingly, the phrase "hardware component" or "hardware module" should be understood to encompass a tangible entity that may be physically constructed, permanently configured (e.g., hardwired), or temporarily configured (e.g., programmed) to operate in a certain manner or to perform certain operations described herein.

In addition, the modules and components can be implemented as firmware or functional circuitry within hardware devices. Further, the modules and components can be implemented in any combination of hardware devices and software components, or only in software (e.g., code stored or otherwise embodied in a machine-readable medium or in a transmission medium).

Unless specifically stated otherwise, as apparent from the following discussion, it is appreciated that throughout the description, discussions utilizing terms such as "determining", "providing", "calculating", "computing," "identifying", "combining", "establishing", "sending", "receiving", "storing", "estimating", "checking", "obtaining" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The term "comprising" as used in this specification and claims means "consisting at least in part of". When interpreting each statement in this specification and claims that includes the term "comprising", features other than that or those prefaced by the term may also be present. Related terms such as "comprise" and "comprises" are to be interpreted in the same manner.

As used herein the term "and/or" means "and" or "or", or both.

As used herein "(s)" following a noun means the plural and/or singular forms of the noun.

The singular reference of an element does not exclude the plural reference of such elements and vice-versa.

It is to be understood that the above description is intended to be illustrative, and not restrictive. Many other implementations will be apparent to those of skill in the art upon reading and understanding the above description. Although the disclosure has been described with reference to specific example implementations, it will be recognized that the disclosure is not limited to the implementations described but can be practiced with modification and alteration within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

The invention claimed is:

1. A computer implemented method for validating information in a blockchain, the information being associated with a client device, the method comprising:

receiving a request comprising a data reveal path, the data reveal path referencing a node of interest within an input hierarchical data structure, wherein the input hierarchical data structure is configured as a first Merkle tree including a plurality of input nodes, the plurality of input nodes includes a plurality of parent nodes that each have at least one child node, a plurality of leaf nodes that each have no child nodes, and an input root node;

obtaining the input hierarchical data structure comprising the input root node and the plurality of input nodes, wherein each of the input nodes within the input hierarchical data structure have an associated value:

generating an output hierarchical data structure based on the data reveal path and the input hierarchical data structure, wherein the output hierarchical data structure comprises a plurality of output nodes configured as a second Merkle tree, by performing the steps of:

determining the input root node of the input hierarchical data structure, starting with the input root node, iterating through input nodes of the input hierarchical data structure and, for each input node, performing the following steps:

determining whether the input node is the node of interest or a parent node of the node of interest, based on a determination that the input node is the node of interest or a parent node of the node of interest:

determining the value associated with the input node in the input hierarchical data structure; and inserting the value associated with the input node into the output hierarchical data structure at a node location in the second Merkle tree that corresponds to a location of the input node in the first Merkle tree, and based on a determination that the input node is neither the node of interest nor a parent node of the node of interest:

determining the value associated with the input node;

executing a one-way cryptographic hash function with an input of the value associated with the input node to calculate a digest; and inserting the digest into the output hierarchical data structure at a node location in the second Merkle tree that corresponds to a location of the input node in the first Merkle tree;

wherein each of the plurality of output nodes has an associated node in the input hierarchical data structure, wherein the plurality of output nodes comprises an output root node, and an output node of interest that is associated with the node of interest within the input hierarchical data structure, and wherein the output node of interest and each parent node of the output node of interest comprises a value and all other nodes in the output hierarchical data structure comprise a digest based on the associated value of a corresponding node of the input hierarchical data structure; and determining the validity of the information in the blockchain associated with the client device based on a comparison of the input root node of the of the input hierarchical data structure and the output root node of the output hierarchical data structure.

2. The method of claim 1, wherein a digest associated with the input root node and a digest associated with the output root node are the same.

3. The method of claim 1, further comprising the step of, recording data based on the input root node on the blockchain.

4. The method of claim 1, wherein the output node corresponding to the data reveal path and each parent node of the output node corresponding to the data reveal path of the output hierarchical data structure further comprises a salt.

5. The method of claim 4, wherein the salt is based on a randomly generated value.

6. The method of claim 4, wherein each salt is based on a path of its associated node.

7. The method of claim 6, wherein each salt is a digest based on a randomly generated value and the path of its associated node.

8. The method of claim 1, wherein the request comprises one or more data reveal paths wherein each data reveal path references a node of interest and wherein each node of interest and each all parent node of the nodes of interest in the output hierarchical data structure comprises a value and all other nodes in the output hierarchical data structure comprise a digest.

9. The method of claim 1, wherein the input hierarchical data structure and/or the output hierarchical data structure is represented using a JavaScript Object Notation (JSON) object.

10. The method of claim 9, wherein the JSON object has a canonical format.

11. The method of claim 1, wherein each node of the output hierarchical data structure, except for leaf nodes, is a Merkle tree root such that a digest for each node can be calculated based on digests of its child nodes.

12. The method of claim 1, further comprising the step of: transmitting the output hierarchical data structure.

13. The method of claim 1, wherein the digest of each node of the output hierarchical data structure that comprises a digest obliviates or redacts a value of associated with the node.

14. The method of claim 1, wherein the value of each parent node of the output node of interest is based on its child nodes.

15. A computer program product embodied on non-transitory computer readable media comprising instructions that, when executed by a computer, cause the computer to carry out a method for validating information in a blockchain, the information being associated with a client device, the method comprising:

receiving a request comprising a data reveal path, the data reveal path referencing a node of interest within an input hierarchical data structure, wherein the input hierarchical data structure is configured as a first Merkle tree including a plurality of input nodes, the plurality of input nodes includes a plurality of parent nodes that each have at least one child node, a plurality of leaf nodes that each have no child nodes, and an input root node;

obtaining the input hierarchical data structure comprising the input root node and the plurality of input nodes, wherein each of the input nodes within the input hierarchical data structure have an associated value;

generating an output hierarchical data structure based on the data reveal path and the input hierarchical data structure, wherein the output hierarchical data structure comprises a plurality of output nodes configured as a second Merkle tree by performing the steps of:

determining the input root node of the input hierarchical data structure, starting with the input root node, iterating through input nodes of the input hierarchical data structure and, for each input node, performing the following steps:

determining whether the input node is the node of interest or a parent node of the node of interest, based on a determination that the input node is the node of interest or a parent node of the node of interest:

determining the value associated with the input node in the input hierarchical data structure; and inserting the value associated with the input node into the output hierarchical data structure at a node location in the second Merkle tree that corresponds to a location of the input node in the first Merkle tree, and based on a determination that the input node is neither the node of interest nor a parent node of the node of interest:

determining the value associated with the input node;

executing a one-way cryptographic hash function with an input of the value associated with the input node to calculate a digest; and inserting the digest into the output hierarchical data structure at a node location in the second Merkle tree that corresponds to a location of the input node in the first Merkle tree;

wherein each of the plurality of output nodes has an associated node in the input hierarchical data structure, wherein the plurality of output nodes comprises an output root node, and an output node of interest that is associated with the node of interest within the input hierarchical data structure, and wherein the output node of interest and each parent node of the output node of interest comprises a value and all other nodes in the output hierarchical data structure comprise a digest based on the associated value of a corresponding node of the input hierarchical data structure and determining the validity of the information in the blockchain associated with the client device based on a comparison of the input root node of the of the input hierarchical data structure and the output root node of the output hierarchical data structure.

* * * * *